United States Patent
Hung

(10) Patent No.: US 10,801,889 B2
(45) Date of Patent: *Oct. 13, 2020

(54) SPECTROMETER MODULE AND FABRICATION METHOD THEREOF

(71) Applicant: OTO PHOTONICS INC., Hsinchu (TW)

(72) Inventor: Chien-Hsiang Hung, Hsinchu (TW)

(73) Assignee: OTO PHOTONICS INC., Hsinchu (TW)

( * ) Notice: Subject to any disclaimer, the term of this patent is extended or adjusted under 35 U.S.C. 154(b) by 14 days.

This patent is subject to a terminal disclaimer.

(21) Appl. No.: 16/411,137

(22) Filed: May 13, 2019

(65) Prior Publication Data

US 2019/0271589 A1 Sep. 5, 2019

Related U.S. Application Data

(63) Continuation of application No. 15/371,229, filed on Dec. 7, 2016, now Pat. No. 10,302,486.

(30) Foreign Application Priority Data

Jul. 12, 2016 (TW) .............................. 105121955 A

(51) Int. Cl.
*G01J 3/02* (2006.01)
*G01J 3/18* (2006.01)

(52) U.S. Cl.
CPC ............ *G01J 3/0256* (2013.01); *G01J 3/0202* (2013.01); *G01J 3/0229* (2013.01); *G01J 3/0297* (2013.01); *G01J 3/18* (2013.01)

(58) Field of Classification Search
CPC ....... G01J 3/0256; G01J 3/0202; G01J 3/0229
See application file for complete search history.

(56) References Cited

U.S. PATENT DOCUMENTS

| | | | | |
|---|---|---|---|---|
| 5,550,375 A | * | 8/1996 | Peters | G01J 3/02 250/343 |
| 6,579,149 B2 | * | 6/2003 | Lebel | H01L 21/681 451/6 |
| 7,520,956 B2 | * | 4/2009 | Samukawa | H01L 22/34 156/345.13 |
| 8,390,806 B1 | * | 3/2013 | Subramanian | G01J 3/0259 356/328 |
| 10,302,486 B2 | * | 5/2019 | Hung | G01J 3/0202 |
| 2007/0159635 A1 | * | 7/2007 | Urey | G01J 3/4532 356/451 |

* cited by examiner

*Primary Examiner* — Dominic J Bologna
(74) *Attorney, Agent, or Firm* — Cheng-Ju Chiang

(57) ABSTRACT

A spectrometer module and a fabrication method thereof are provided. The fabrication method includes the steps of: providing at least one substrate; and forming at least one positioning side and at least one optical component of the spectrometer on the at least one substrate by a microelectromechanical systems (MEMS) process. The spectrometer module fabricated by the fabrication method includes a plurality of substrates and at least one optical component. At least one of the substrates has at least one positioning side, and the at least one optical component of the spectrometer is formed on at least one of the substrates. The positioning side and the optical component are fabricated by a MEMS process.

20 Claims, 22 Drawing Sheets

SPECTROMETER MODULE AND FABRICATION METHOD THEREOF

CROSS-REFERENCE TO RELATED APPLICATION

The present application is a continuation application of U.S. patent application Ser. No. 15/371,229, filed Dec. 7, 2016, the disclosure of which is hereby incorporated by reference herein in its entirety.

FIELD OF THE INVENTION

The present invention relates to an optical module and the fabrication method thereof, and more particularly to a spectrometer module and the fabrication method thereof.

BACKGROUND OF THE INVENTION

Small-sized microspectrometers in the existing art includes a plurality of optical components, such as a slit, a pair of waveguide sheets and a micrograting. After passing through the slit, light would travel within the gap formed between the pair of waveguide sheets and incident the micrograting, which then disperses the light into a plurality of spectral rays. The spectral rays incident a linear detector from the micrograting, and are converted into electrical signals by the linear detector. The electrical signals are analyzed by a processor or other external component to obtain the intensity of the spectral rays Considering the limited size of microspectrometers, arrangement of the optical components of the microspectrometer has to be highly precise, and tolerance from assembly of the optical components has to be strictly controlled. Otherwise, stray lights would occur in the interior of the microspectrometer, leading to distorted measurements and reduced measurement accuracy of the microspectrometer.

BRIEF SUMMARY OF THE INVENTION

Therefore, the present invention provides a spectrometer module that utilizes a plurality of precisely arranged optical components to improve measurement accuracy.

The present invention also provides a fabrication method of the spectrometer that precisely arranges the plurality of optical components.

According to an embodiment of the present invention, a fabrication method of a spectrometer module includes the steps of: providing at least one substrate; and forming at least one positioning side and at least one optical component of the spectrometer on the at least one substrate by a microelectromechanical systems (MEMS) process.

According to another embodiment of the present invention, a spectrometer module fabricated by the fabrication method includes a plurality of substrates and at least one optical component. At least one of the substrates has at least one positioning side, and the at least one optical component of the spectrometer is formed on at least one of the substrates. The positioning side and the optical component are fabricated by a MEMS process.

In sum, the embodiments of the present invention utilize MEMS processes to form at least one positioning side and at least one optical component on a single substrate, therefore effectively improving positioning precision of the spectrometer module, promoting structural and positional precision of the optical components, significantly advances the overall precision of the spectrometer module.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE INVENTION

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The spectrometer module according to an embodiment of the present invention includes a plurality of substrates. At least one of the substrates includes at least one positioning side, each fabricated by a microelectromechanical system (MEMS) process and having a tolerance of less than 3 µm. The positioning sides may position or align a plurality of optical components so that the optical components are precisely arranged. The optical components are slit, diffraction grating and other spectral components. The MEMS process may include a plurality of steps, such as photolithography, wet etching and dry etching.

Figure 1A:
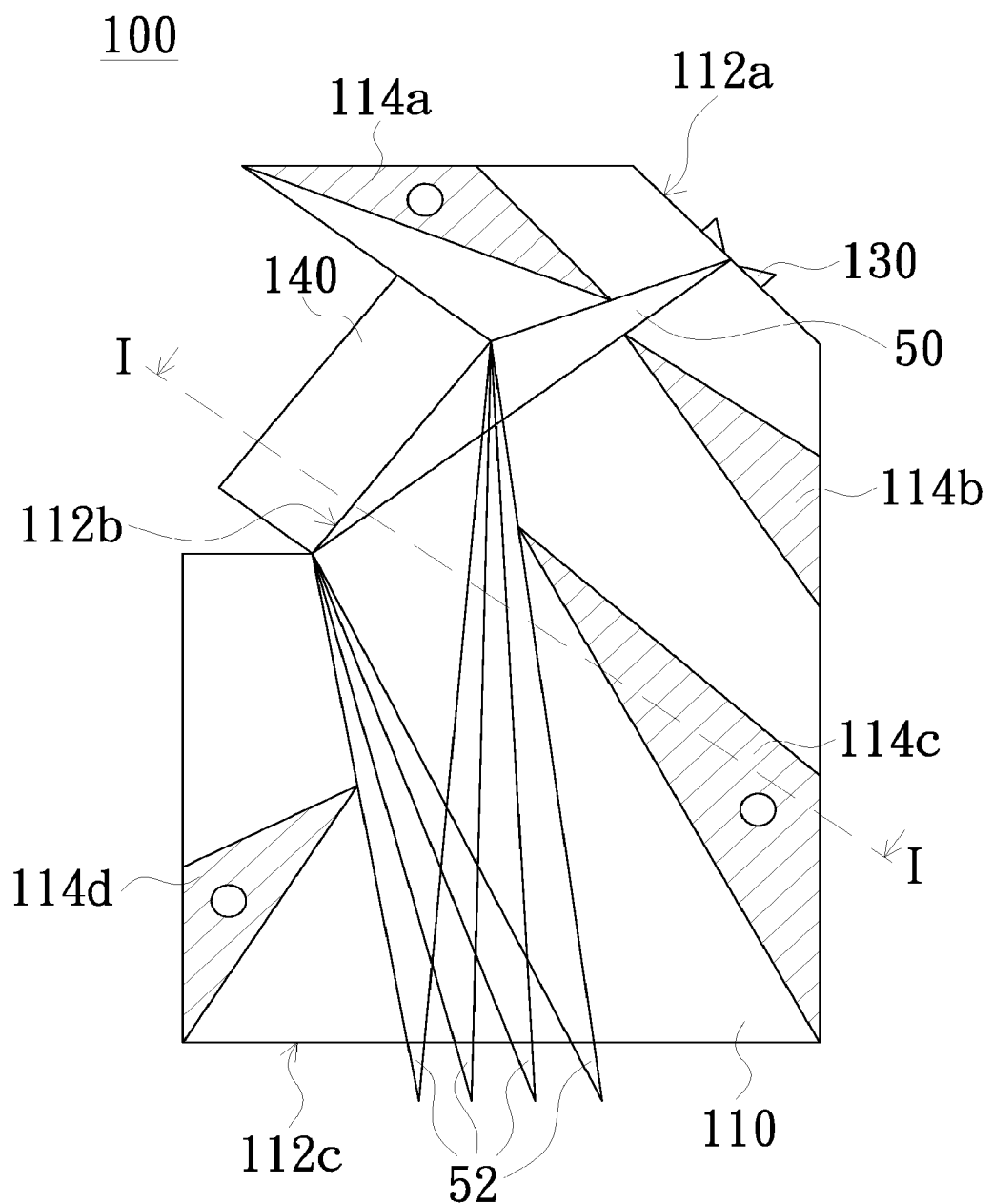
FIG. 1A is a top view of a spectrometer module according to an embodiment of the present invention.
Figure 1B:
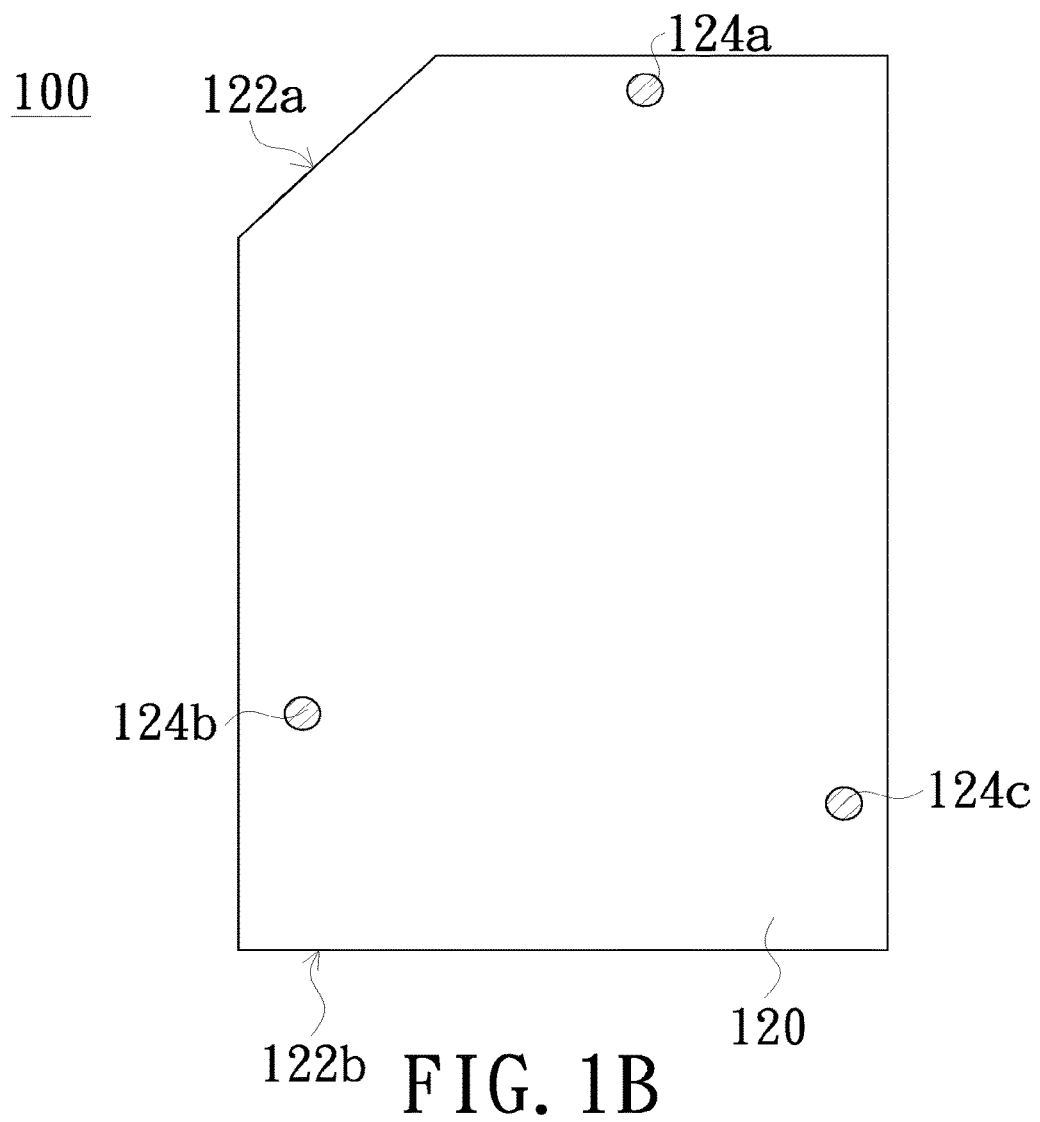
FIG. 1B is a bottom view of the spectrometer module in FIG. 1A.
Figure 1C:
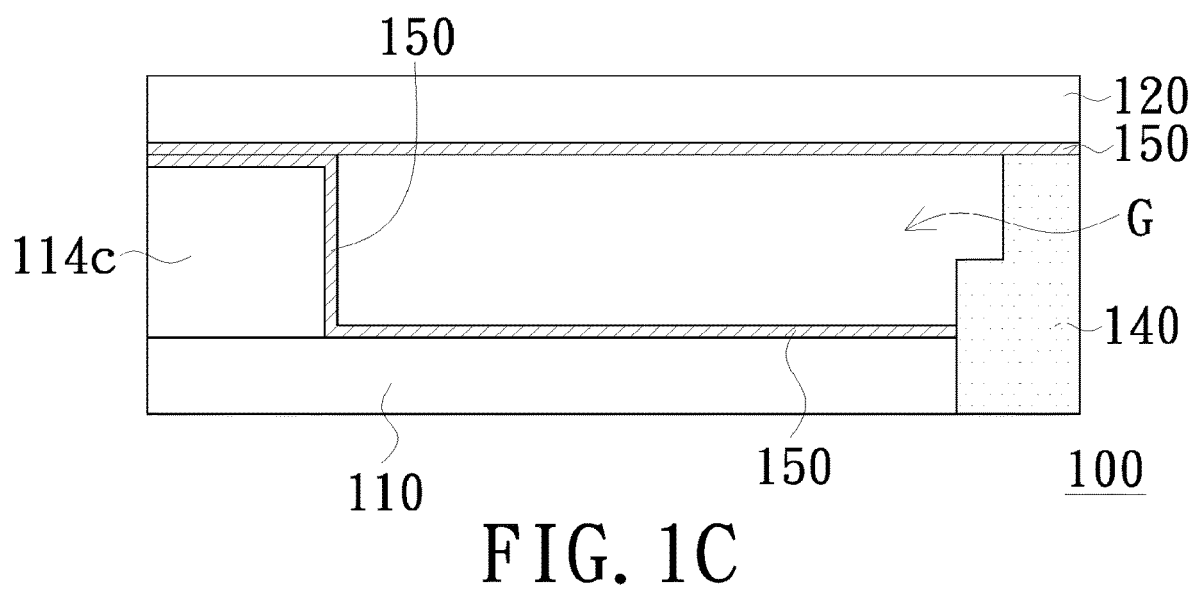
FIG. 1C is a cross-sectional view of the spectrometer module in FIG. 1A along line I-I.

Referring now to FIG. 1A through FIG. 1C. FIG. 1A is a top view of a spectrometer module according to an embodiment of the present invention; FIG. 1B is a bottom view of the spectrometer module in FIG. 1A; and FIG. 1C is a cross-sectional view of the spectrometer module in FIG. 1A along line I-I. As shown in FIGS. 1A-1C, the spectrometer module 100 includes substrates 110 and 120. The substrate 110 includes positioning sides 112a, 112b and 112c; and the substrate 120 includes positioning sides 122a and 122b. The positioning side 112a is aligned with the positioning side 122a. In the present embodiment, the spectrometer module 100 further includes a plurality of optical components 114a, 114b, 114c, 114d, 124a, 124b and 124c. However, other embodiments may include only one spectral component in the spectrometer module 100. At least one of the substrates 110 and 120 may constitute a portion of a housing.

As all of the positioning sides and optical components are fabricated microelectromechanically, the positioning sides 112a-112c, 122a and 122b and the optical components 114a-114d and 124a-124c are highly precise. Therefore, when a slit member 130 abuts the positioning sides 112a and 122a and a grating 140 abuts the positioning side 112b, the slit member 130 and the grating 140 may be precisely positioned. In other words, the positioning sides 112a, 122a and 112b allow the slit member 130 and the grating 140 to be correctly disposed at their designated positions and orientations. Consequently, incident light 50 may correctly pass through the slit member 130 and incident the grating 140, which disperses the incident light 50 into a plurality of spectral rays 52 of different wavelengths.

Meanwhile, the positioning sides 112c and 122b may be abutted by a photo detector (not shown in FIGS. 1A-1C), so that the photo detector is precisely positioned and a portion or all of the spectral rays 52 could correctly incident the photo detector. The photo detector may be a charge coupled device (CCD) or a complementary metal oxide semiconductor (CMOS) image sensor.

The substrates 110 and 120 are two reflective sheets that face each other. In the present embodiment, the optical components 114a, 114b, 114c and 114d may be spacers sandwiched between the substrates 110 and 120 for spacing the substrates 110 and 120 apart to form a gap G. Light that passes through the slit and enters the spectrometer module 100 would be reflected by the substrates 110 and 120 and thus transmitted within the gap G. Therefore, the substrates 110 and 120 of the present embodiment may be waveguide sheets. Also, the optical components 114a, 114b, 114c and 114d may block stray light, thus reducing the chance of stray light entering the photo detector and improving measurement precision.

In the present embodiment, at least one optical component shown in FIG. 1A may fit with at least one optical component shown in FIG. 1B so that the substrates 110 and 120 are precisely assembled. For example, the optical components 114a, 114c and 114d may each include at least one hole (as illustrated in FIG. 1A by opened unannotated circles) while the optical components 124a, 124b and 124c are cylindrical in shape. Thus, the optical components 124a, 124b and 124c may be inserted through the holes of the optical components 114a, 114c and 114d, so that the optical component 114a fits with the optical component 124a, the optical component 114c fits with the optical component 124c, and the optical component 114d fits with the optical component 124b. The fitting of the optical components may be transition fit or clearance fit. Such fit between optical components (for example, cylinder-and-hole fit between the optical components 124a-c and 114a, 114c, 114d) improves positioning of the substrates 110 and 120 during assembly and reduces generation of stray light within the spectrometer module 100.

Figure 2A:
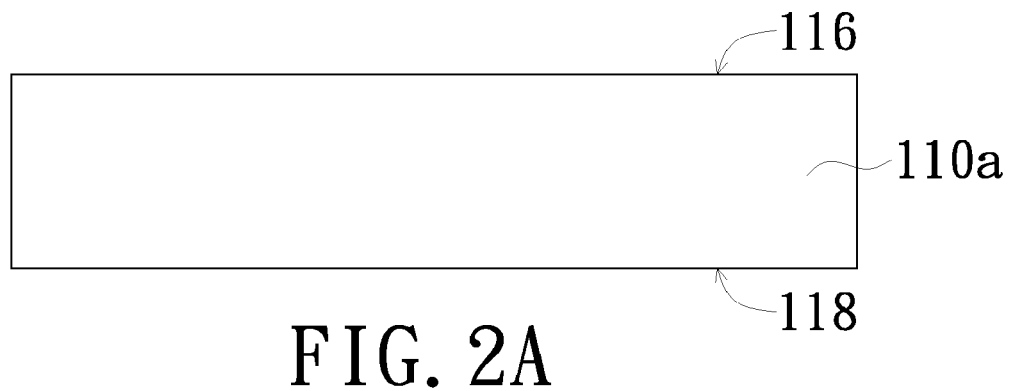
FIGS. 2A-2F are cross-sectional views of the spectrometer module throughout the steps of the fabrication method of the spectrometer module in FIG. 1A.

Referring now to FIG. 2A through FIG. 2F, which illustrate cross-sectional views of the spectrometer module throughout the steps of the fabrication method of the spectrometer module in FIG. 1A. As shown in FIG. 2A, the first step of the fabrication method of the spectrometer module 100 involves providing at least one substrate 110a having a first surface 116 and a second surface 118 opposite to the first surface 116. In the embodiment illustrated in FIGS. 2A-2F, the substrate 110a is to be manufactured into the substrate 100; however, in other embodiments, the substrate 110a may also be manufactured into the substrate 120. That is, the substrates 110 and 120 may subject to a substantially identical fabrication process. Therefore, the substrate 110a may be manufactured into a waveguide sheet.

The substrate 110a may be a semiconductor substrate; for example, a silicon wafer. In other embodiments, the substrate 110a may be a metal sheet (for example, an aluminum substrate), a polished substrate (for example, a sapphire substrate) or other types of substrate. In general, a standard silicon wafer is also a polished substrate; therefore, waveguide sheet manufactured from the substrate 110a needs not be polished, hence reducing the steps of the fabrication process and avoiding formation of lead angles.

Thereafter, as illustrated in FIGS. 2B-2F, a MEMS process is performed to form at least one positioning side 112 and at least one optical component 114 on the substrate 110a. The positioning side 112 may be one of the positioning sides 112a, 112b and 112c shown in FIG. 1A. The optical component 114 may be one of the optical components 114a, 114b, 114c and 114d shown in FIG. 1A. In other embodiments, each of the optical components 114 may be a slit (for example, slit member 130), a collimation lens, a focus lens, a reflective mirror, a light shielding layer, a positioning member, or a grating.

The light shielding layer may block stray light and reduce the chance of stray light entering the photo detector to improve measurement precision. The substrate 110a or each of the optical components 114 may include one or more diverging openings formed on the intended optical path of the spectrometer. For example, in the case where the intended optical path is formed by the spectral rays 52 and the incident light 50 as illustrated in FIG. 1A, the diverging openings may be disposed on the extension plane of the substrate 110*a* onto which the intended optical path projects. In other words, the diverging openings may be disposed on the light transmission path between the slit (for example, slit member 130) and the diffraction grating (for example, the grating 140) or between the diffraction grating (for example, the grating 140) and the photo detector. Alternatively, the diverging openings may also be formed close to, or even adjacent to, the photo detector. The diverging openings may guide lights of large diverging angle to exit the waveguide space and leave the gap G, so as to reduce the chance of reception of the lights of large diverging angle by the photo detector and thus improve resolution and measurement precision of the spectrometer.

When the optical components 114 are gratings, the optical components 114 may be reflective gratings, planar gratings, Rowland circular gratings or concave gratings. Diffraction surface of the concave grating may be curved, freeform or concave cylindrical. The concave cylindrical surface may be cylindrically curved, parabolic cylindrical or freeform cylindrical. When the diffraction surfaces of the optical components 114 are freeform cylindrical, the gratings formed by the optical components 114 may be concave gratings with inflection points as disclosed by U.S. Pat. No. 9,146,155.

Figure 2B:

Referring now to FIG. 2B. The MEMS process may include etching the substrate 110*a* to form at least one depression 112 on the substrate 110*a*. Sidewall of the depression 112 is the positioning side 112. In the etching process, the substrate 110*a* is etched from the first surface 116; no depression 1122 is formed on the second surface 118. Hence, the depression 1122 has a bottom and an opening exposed on the first surface 116. Further, prior to etching the substrate 110*a*, a mask (not illustrated) may be formed on the first surface 116 of the substrate 110*a*; for example, forming a patterned photoresist having an opening that has a shape identical to the shape of the opening of the depression 1122. Thereafter, the mask is utilized to etch the substrate 110*a* to form the depression 112 that extends from the first surface 116.

Figure 2C:
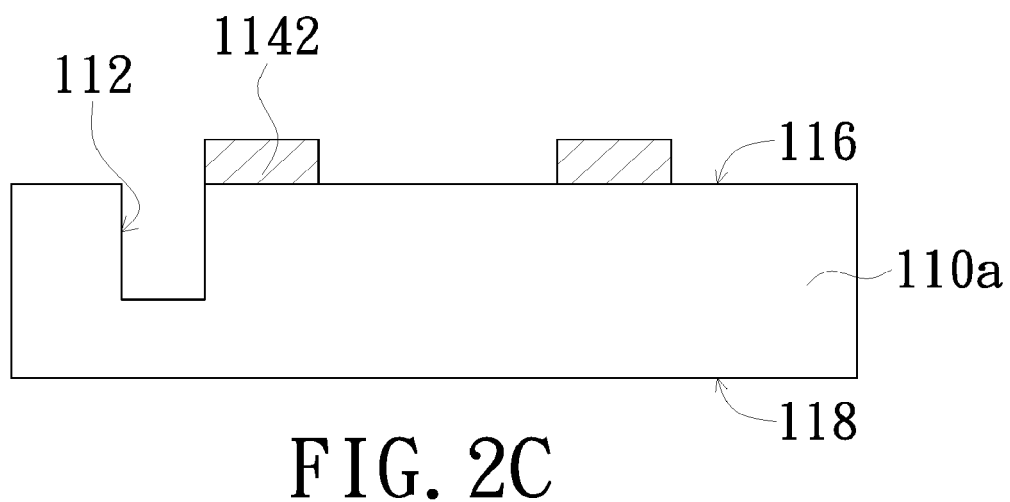

Referring now to FIG. 2C. A patterned mask layer 1142 is formed on the first surface 116 of the substrate 110*a*, by photolithography for example. Specifically, the patterned mask layer 1142 is formed by coating the entire first surface 116 with a photoresist layer and removing a portion of the photoresist layer by exposure and development. As shown in FIG. 2C, the depression 1122 is not covered by the patterned mask layer 1142, and sidewall of the depression 1122 may be aligned with sidewall of the patterned mask layer 1142. Further, the patterned mask layer 1142 may be comprised of thin film photoresist, such as SU-8 photoresist.

Figure 2D:
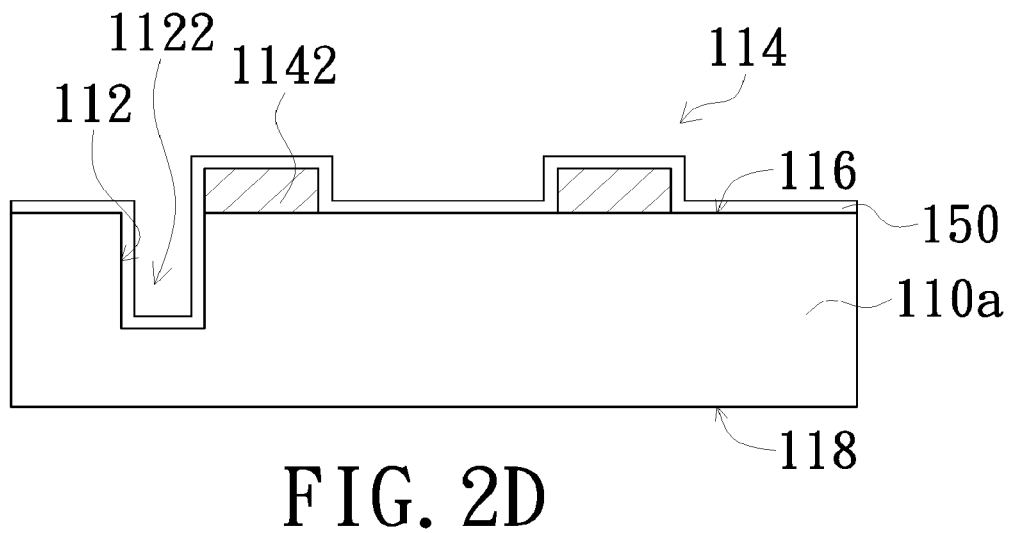

Referring now to FIG. 2D. In the embodiment, the MEMS process further includes forming a reflective layer 150 on the first surface 116 after etching the substrate 110*a* and covering the patterned mask layer 1142 with the reflective layer 150. The patterned mask layer 1142 covered with the reflective layer 150 forms at least one of the optical components 114; that is, the optical components 114 may include the patterned mask layer 1142 and the reflective layer 150 covering the patterned mask layer 1142. The reflective layer 150 may be a metal layer formed by chemical vapor deposition (CVD) or physical vapor deposition (PVD); and the PVD may involve evaporation or sputtering. In the case where the reflective layer 150 is formed by PVD, the reflective layer 150 may cover the patterned mask layer 1142 and the depression 1122 conformally.

The reflective layer 150 is very thin. In general, width of the reflective layer 150 formed by PVD is smaller than 1 μm; for example, 10 nm. Therefore, although the reflective layer 150 covers the positioning side 112 (that is, sidewall of the depression 1122), the positioning function of the positioning side 112 would not be affected by the reflective layer 150. In other words, the positioning side 112 may precisely position the slit member 130, the grating 140 and the photo detector even when covered by the reflective layer 150. Further, a mask, tape or developed photoresist may be utilized to cover the depression 1122 prior to performing the PVD, therefore avoiding deposition of the reflective layer 150 in the depression 1122.

Figure 2E:
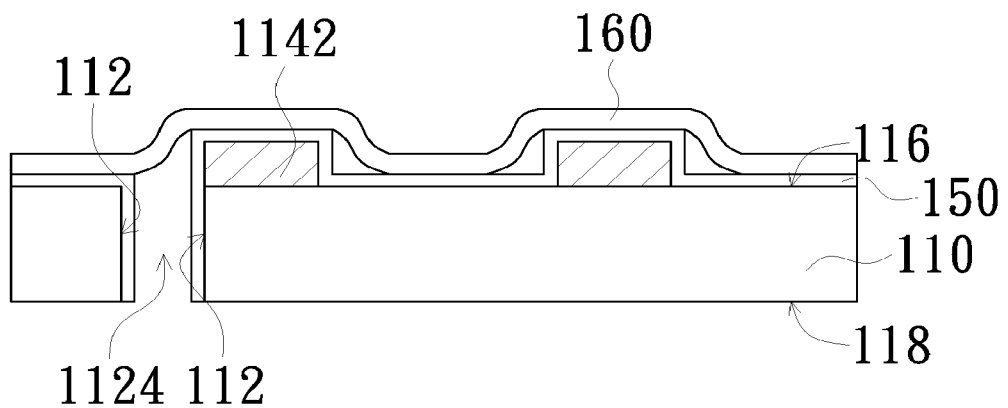
Figure 2F:
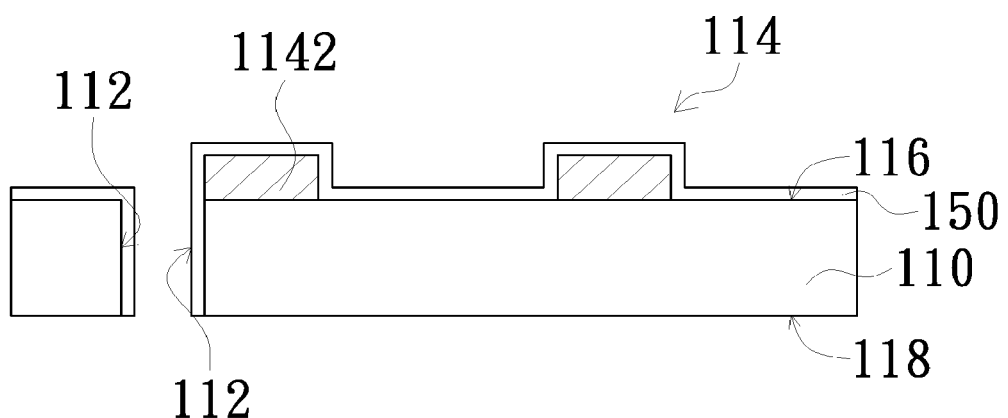

Referring now to FIGS. 2E and 2F. A fixing film 160 is adhered to the first surface 116, passing over and covering the depression 1122. In the present embodiment, the fixing film 160 may be a fixing tape. Thereafter, the second surface 118 of the substrate 110*a* is ground until the bottom of the depression 1122 is removed, so as to divide the substrate 110*a* along the depression 1122 and form one or more substrates 110. Likewise, in other embodiments, removal of the bottom of the depression 1122 may result in one or more substrates 120. Further, grinding of the substrate 110*a* may involve chemical mechanical polishing (CMP); therefore, as the fixing film 160 is adhered to the first surface 116 prior to grinding of the substrate 110*a*, the plurality of divided substrates 110 would be held by the fixing film 160 when the bottom of the depression is removed, thus would not fall apart accidentally. Finally, the fixing film 160 is torn off to obtain finished substrates 110.

In the aforementioned embodiment, the positioning side 112 is formed by etching the substrate 110 or 120, and the optical component 114 includes the reflective layer 150 and the patterned mask layer 1142. However, in other embodiments, the positioning side 112 may be formed by patterned photoresist 1142 on the substrate 110; that is, the positioning side 112 may be the lateral side of the patterned photoresist 1142. Meanwhile, the optical component 114 may be formed by etching the substrate 110 and plating the etched portion of the substrate 110 with the reflective layer 150. Therefore, the positioning side 112 may be lateral surface of the patterned mask layer 1142 or surface formed by etching the substrate 110 or 120; the optical component 114 may be formed by the patterned mask layer 1142 or etched portion of the substrate 110 or 120. Further, the grating 140 may be a reflective diffraction grating fabricated by a MEMS process.

Figure 3A:
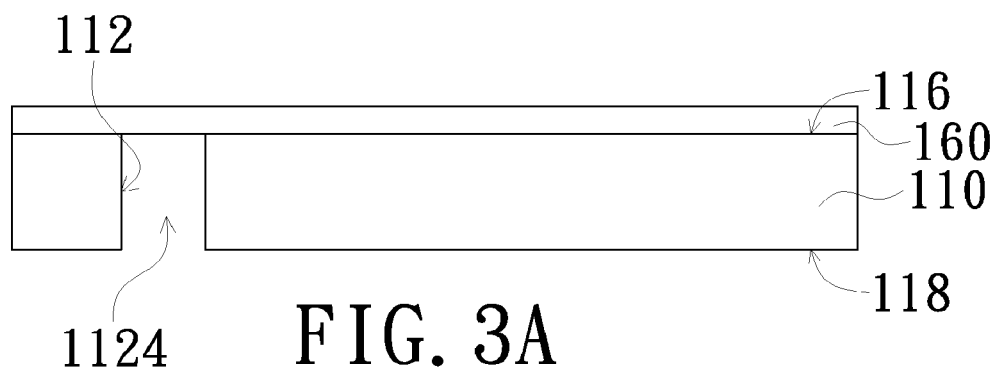
FIGS. 3A-3C are cross-sectional views of the spectrometer module throughout parts of the steps of the fabrication method of the spectrometer in FIG. 1A.
Figure 3B:
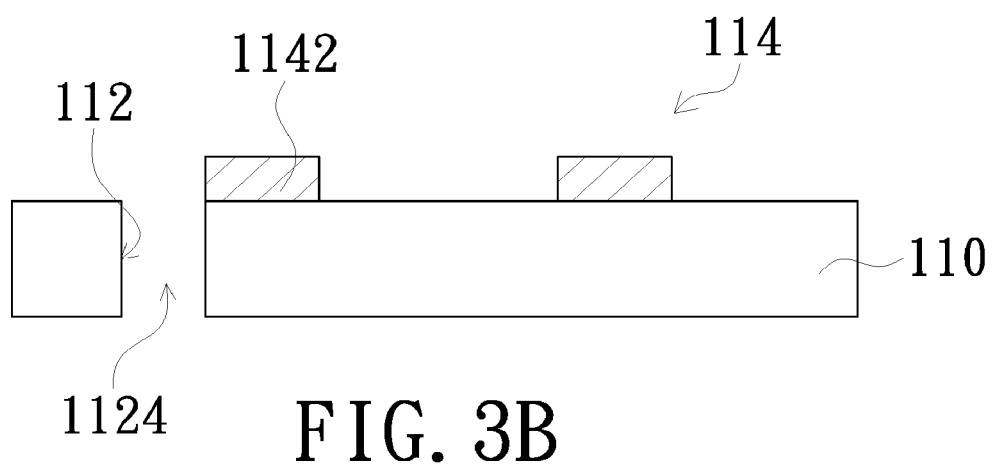
Figure 3C:
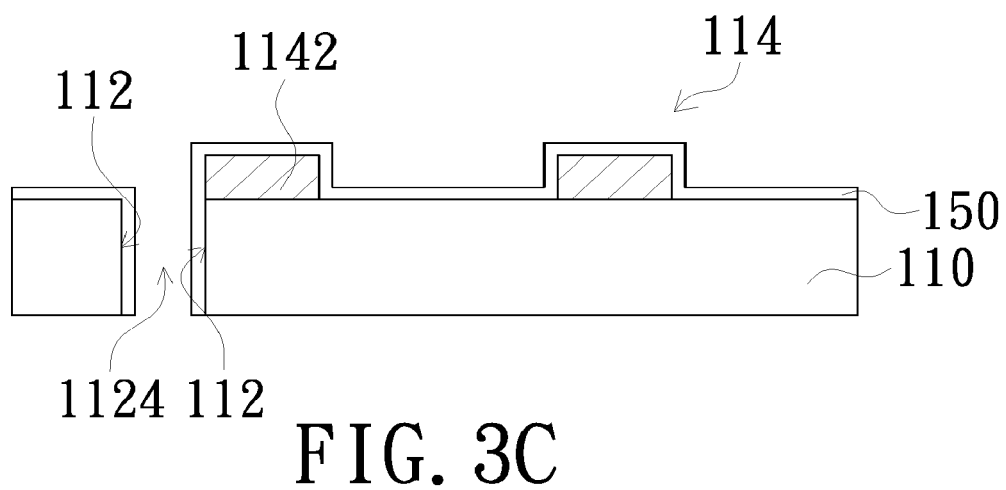

Referring now to FIG. 3A through FIG. 3C, which illustrates cross-sectional views of the spectrometer module throughout parts of the steps of the fabrication method of the spectrometer in FIG. 1A. The spectrometer fabrication method in the present embodiment is similar to that in the embodiment illustrated in FIGS. 2A-2F; the difference between the two embodiments lies in the order of steps. Specifically, after completion of the step shown in FIG. 2B, a fixing film 160 is adhered to the first surface 116, passing over and covering the depression 1122 shown in FIG. 2B. Thereafter, as illustrated in FIG. 3A, the second surface 118 of the substrate 110*a* is then ground until the bottom of the depression 1122 is removed, so as to divide the substrate 110*a* along the depression 1122 and form one or more substrates 110. As illustrated in FIG. 3B, the fixing film 160 is then torn off and the patterned mask layer 1142 is formed on the first surface 116. Finally, as illustrated in FIG. 3C, the reflective layer 150 is formed on the first surface 116 and covers the patterned mask layer 1142.

It is to be understood that while the MEMS process adopted in the embodiments illustrated in FIGS. 2A-2F and FIGS. 3A-3C includes photolithography and etching, other embodiments may adopt a MEMS process that includes electrocasting. That is, electrocasting may form at least a portion of at least one of the optical components 114 on the substrate 110 or 120. For example, a plating resist layer, such as a patterned photoresist may be formed on the substrate 110a, so that the plating resist layer covers the substrate 110a and exposes a portion of the substrate 110a.

Thereafter, electroplating is performed to form an electrocasting patterned layer, such as a metal layer on the portion of the substrate 110a not covered by the plating resist layer. The electrocasting patterned layer does not cover the plating resist layer. Subsequently, the plating resist layer is removed to expose a portion of the substrate 110a not covered by the electrocasting patterned layer, so as to form the optical components 114. Therefore, the patterned mask layer 1142 shown in FIG. 2F and FIG. 3C may be replaced by an electrocasting patterned layer comprised of metallic materials. Thereafter, the reflective layer 150 is disposed over the electrocasting patterned layer to form the optical components 114 that include the electrocasting patterned layer and the reflective layer 150.

Additionally, the electrocasting patterned layer is highly reflective as it may be metallic. Therefore, the optical components 114 may be formed by the electrocasting patterned layer without having the reflective layer 150. Further, in the electrocasting process, a thick layer of electrocasting patterned layer covering the entire plating resist layer may be deposited, so as to obtain a one-piece spectrometer module having the substrate and the optical components made of the same material after removal of the photo resist layer and the substrate 110a.

Figure 4:
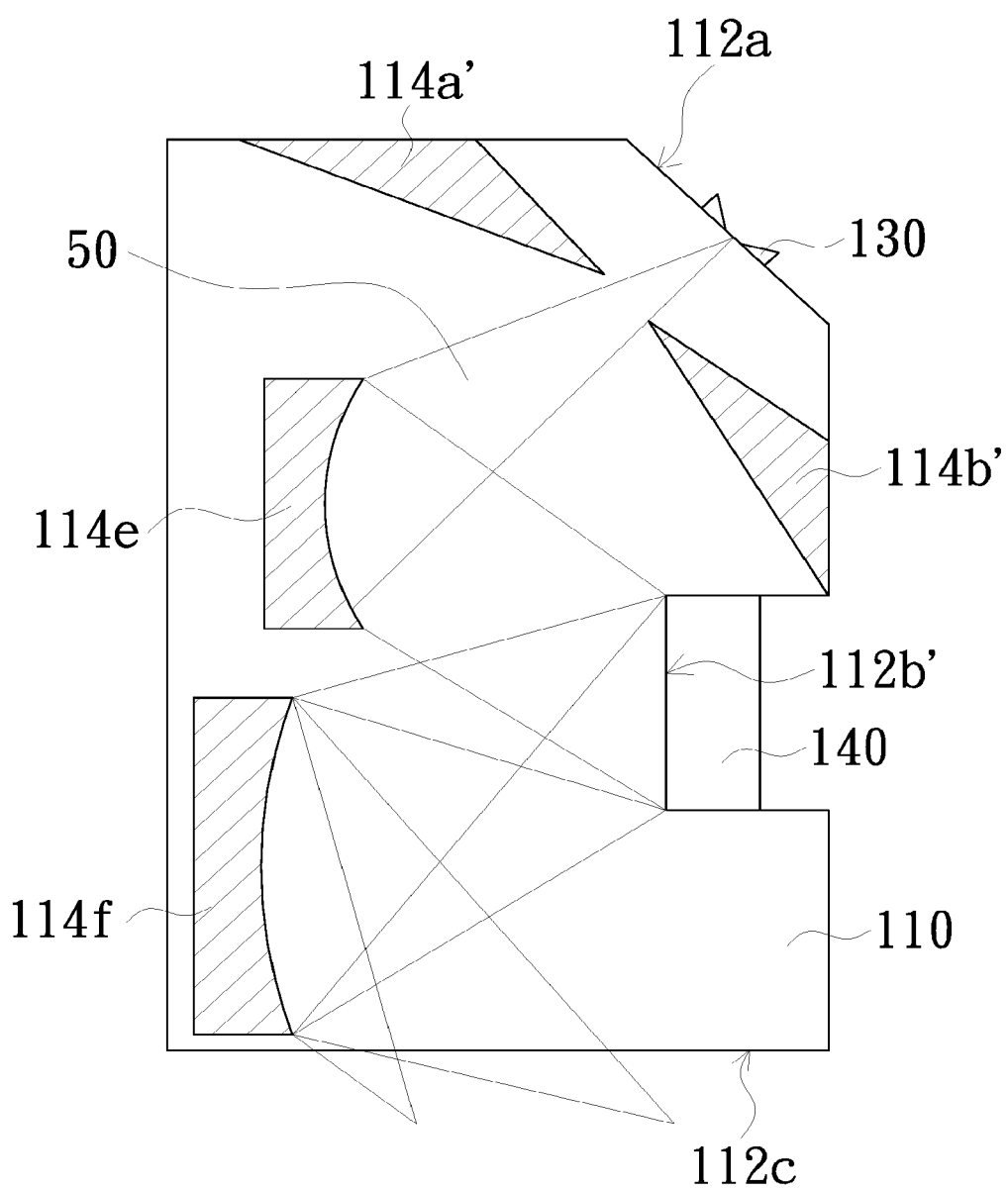
FIG. 4 is a partial view of a spectrometer module according to another embodiment of the present invention.

Referring now to FIG. 4, which illustrates a partial view of a spectrometer module according to another embodiment of the present invention. The spectrometer module 100b of the present embodiment is similar to the spectrometer module 100 shown in FIG. 1A. However, the optical components 114e in the spectrometer module 100b of the present embodiment are collimation lenses for more precisely transmitting the light beam 50 from the slit member 130 to the grating 140 abutting the positioning side 112b'. In contrast, the diffraction surface of the grating 140 in FIG. 1A may be curved, freeform or concaved cylindrical. When the diffraction surface of the grating 140 in FIG. 1A is freeform cylindrical, the gratings formed by the optical components 114 may be concave gratings as disclosed by U.S. Pat. No. 9,146,155.

However, the grating 140 shown in FIG. 4 is a planar grating that would disperse spectral rays. Therefore, the spectrometer module 100b further includes an optical component 114f disposed on the transmission path of the spectral rays for converging the spectral rays so that the spectral rays would focus at the photo detector. In the present embodiment, the optical components 114a' and 114b' are adopted for light shielding and separation of spaces; therefore, the optical components 114a' and 114b' do not have any opening and could not be assembled as those in the optical components 114a, 114c and 114d illustrated in FIG. 1A.

Figure 5A:
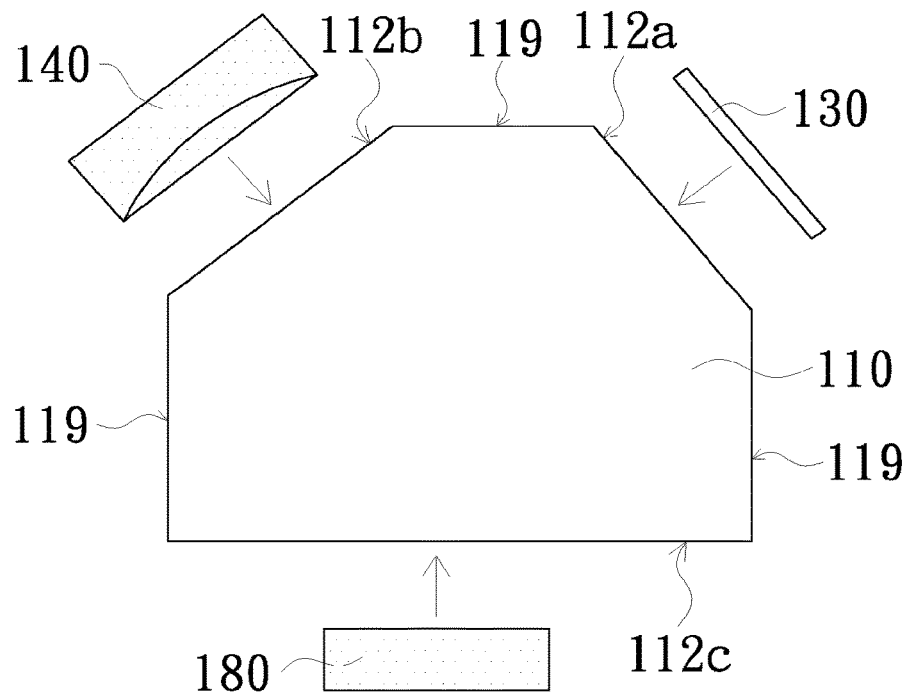
FIG. 5A is a schematic view of the structure of stray light removal sides of a waveguide sheet fabricated by mechanical cutting according to the other embodiment of the present invention.

Referring now to FIG. 5A, which illustrates the structure of stray light removal sides 119 according to an embodiment of the present invention. In the present embodiment, the sides of the substrate 110 or 120 other than the positioning sides 112a, 112b and 112c may be stray light removal sides 119 fabricated by a MEMS process. The stray light removal sides 119 may be formed outside of the intended optical paths of the spectrometer, as illustrated by dotted lines in FIG. 5B. Consequently, stray lights would be directed by the stray light removal sides 119 to completely exit the spectrometer.

Further, the stray light removal sides may be disposed neither adjacent nor opposite to the slit member 130, the grating 140 and the photo detector 180. In other words, the stray light removal sides 119 of the present embodiment need not abut any optical component, such as the slit member 130, the grating 140 or the photo detector 180. Therefore, stray lights exiting the substrate 110 from the stray light removal sides 119 would not incident the slit member 130, the grating 140, the photo detector 180 or other optical components.

As the stray light removal sides 119 need not abut any optical component, the stray light removal sides 119 need not be precisely positioned and may be formed by mechanical cutting. Therefore, tolerance of the stray light removal sides may be greater than 3 μm; precision and optical quality of the spectrometer module would not be affected even if the stray light removal sides 119 are strictly smooth and precise. It is to be understood that in other embodiments, the stray light removal sides 119 may be fabricated by a MEMS process. The positioning sides 112c are adopted for the photo detector 180 to precisely abut against.

Figure 5B:
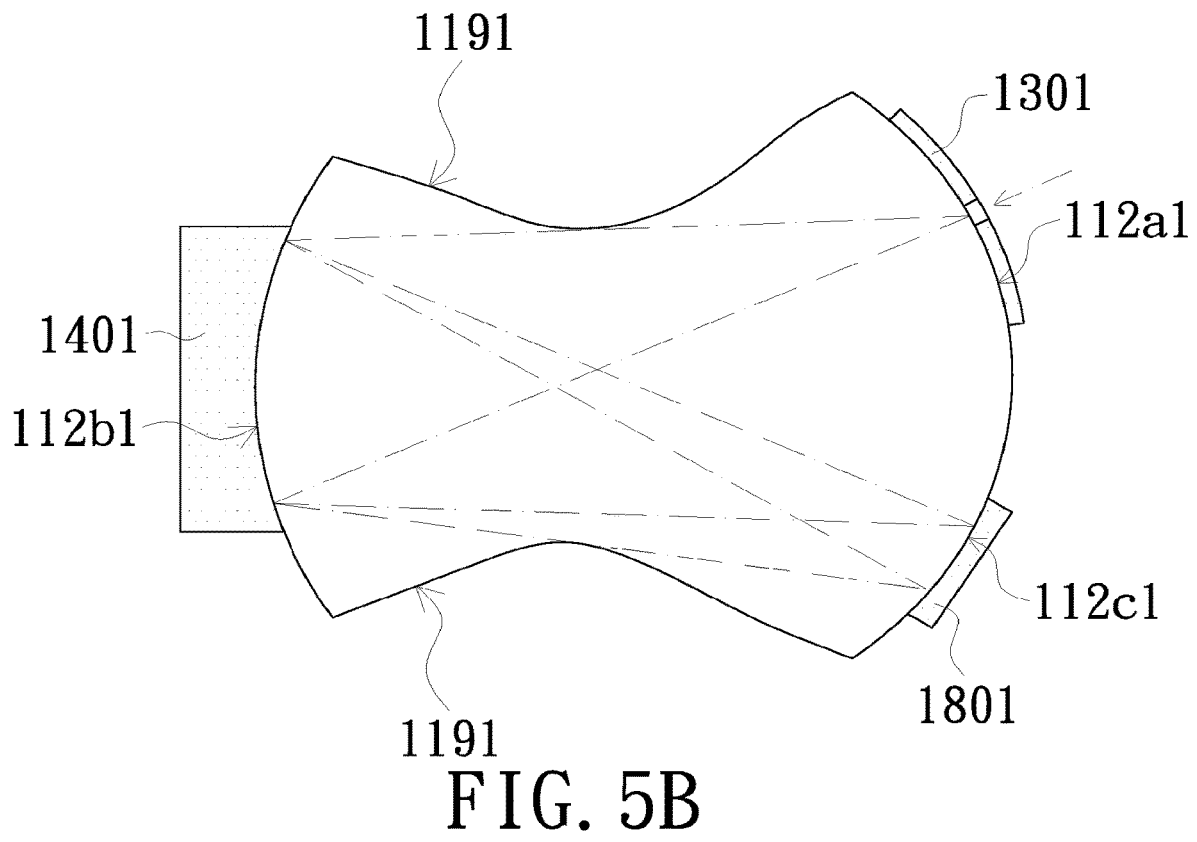
FIG. 5B is a schematic view of the structures of non-linear positioning sides and stray light removal sides according to yet other embodiment of the present invention.

Referring now to FIG. 5B, which illustrates the structures of yet other embodiment of the present invention. The positioning sides and stray light removal sides of the waveguide sheet of the present embodiment are not limited to straight lines, and may be of non-linear shapes formed by MEMS processes. As shown in FIG. 5B, the positioning side 112b1 is curved and allows Rowland circle grating 140 to abut against; meanwhile, the slit member 1301 and the photo detector 1801 may also abut the curved positioning sides 112a1 and 112c1. The stray light removal side 1191 may also be non-linear.

Referring now to FIG. 6A through FIG. 6G, which illustrate the perspective views of the spectrometer module throughout the steps of the fabrication method according to the other embodiment of the present invention. The fabrication method of the present embodiment is similar to that of the aforementioned one; for example, the spectrometer module of the present embodiment is also fabricated by a MEMS process. Therefore, identical technical features, means and effects are not to be repeated herein. However, differences in the MEMS process adopted by the present and aforementioned embodiments are provided as follows.

Figure 6A:
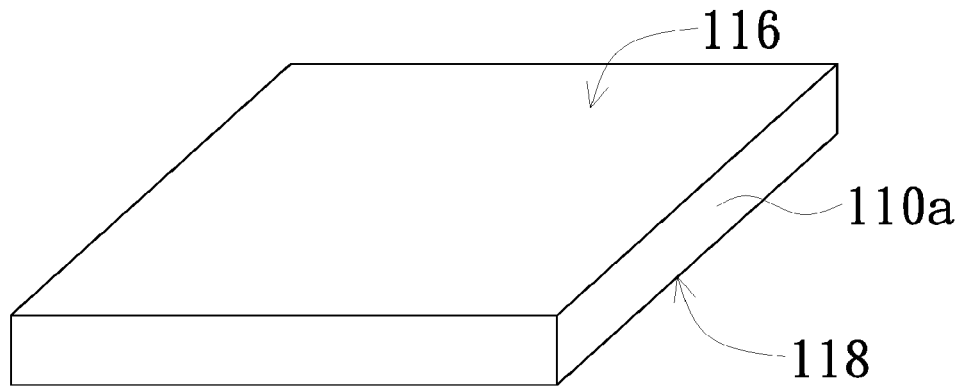
FIGS. 6A-6G are perspective views of the spectrometer module throughout the steps of the fabrication method according to the other embodiment of the present invention.
Figure 6B:
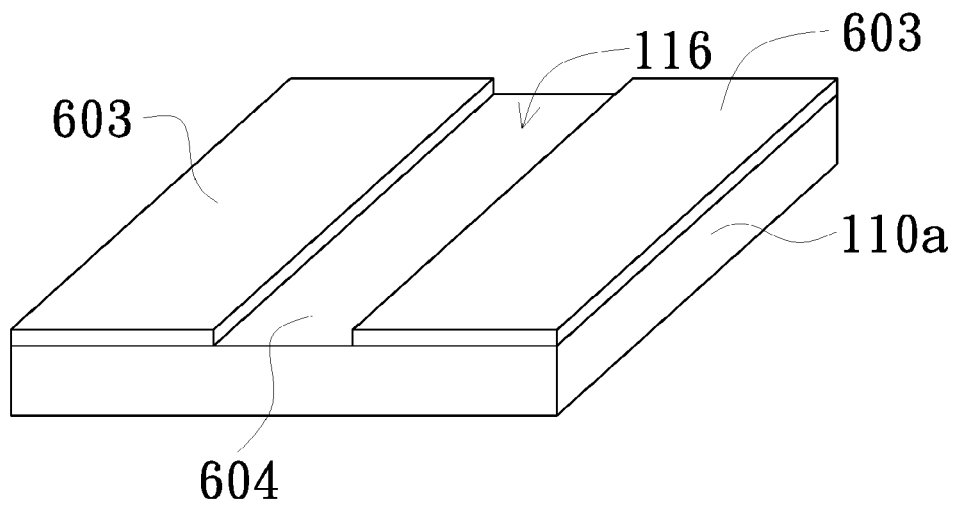

Referring now to FIG. 6A. A substrate 110a is provided. The substrate 110a may be fabricated into substrate 110 or 120 and into a waveguide sheet by the MEMS process as illustrated in FIGS. 6A-6F. Referring now to FIG. 6B. A mask layer 603 is formed on the first surface 116 of the substrate 110a, and exposes a portion of the patterned layer 604 on the first surface 603 for further processing. The mask layer 603 may be a photo resist layer or a hard mask; the hard mask may be a silicon oxide layer formed by oxidation of the surface of the silicon wafer.

Figure 6C:
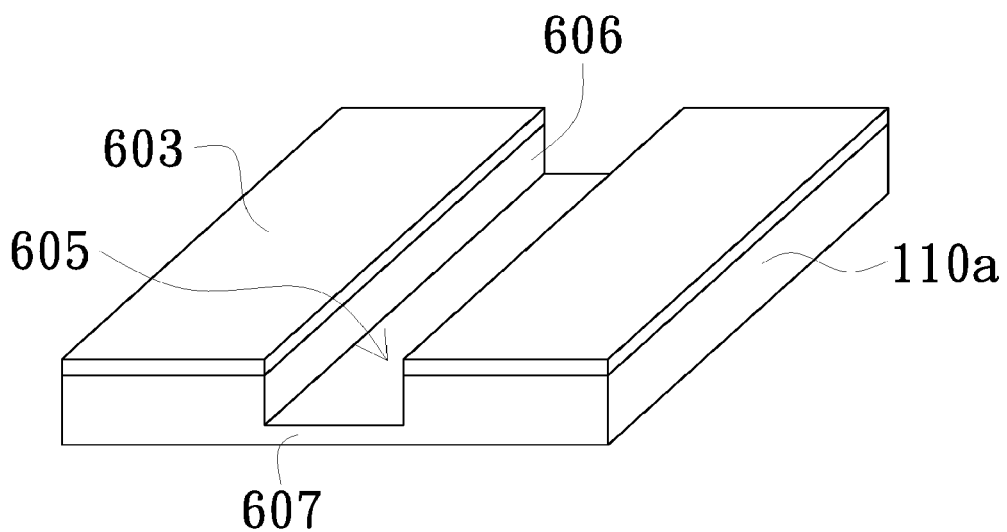

Referring now to FIGS. 6B and 6C. The mask layer 603 is adopted to etch the substrate 110a; that is, the substrate 110a is anisotropically etched at the exposed portion 604 to form an anisotropically etched trench 605 and two anisotropically etched surfaces 606 on the sidewalls of the trench 605. The anisotropic etching may be wet etching or dry etching. The dry etching may be electron beam etching or ion etching. The ion etching may be reactive ion etching (RIE) or deep reactive ion etching (DRIE).

The anisotropically etched trench 605 has a bottom surface and does not penetrate the substrate 110a; in other words, the substrate 110 has a bottom layer 607 under the bottom surface of the anisotropically etched trench 605. The anisotropically etched surfaces 606 may be used as stray light removal sides (for example, stray light removal sides 119 or 1191), positioning sides for abutting the optical components (for example, the grating 140), or surface of the optical components. Thereafter, the mask layer 603 on the substrate 110a is removed by acetone or other chemical agents.

Figure 6D:
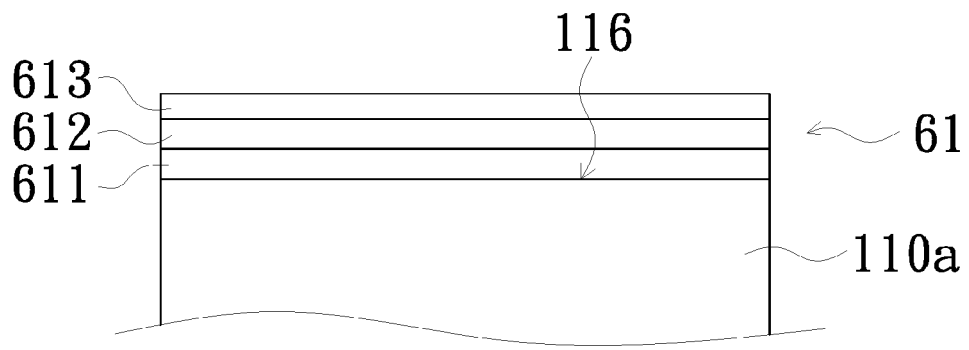

Referring now to FIG. 6D. A reflective layer 61 is formed on the first surface 116 of the substrate 110 by evaporation, sputtering or electroplating. The reflective layer 61 may be adopted as the reflective surface of the waveguide sheet, and may be a single layer or multilayered as illustrated in FIG. 6D. The multilayered reflective layer 61 includes an adhesive layer 611, a reflective metallic layer 612 and a protective layer 613. The adhesive layer 611 is disposed on the first surface 116, and may be a titanium layer. The reflective metallic layer 612 is disposed on the adhesive layer 611, and may be an aluminum layer; in addition, the reflective metallic layer 612 may be the reflective layer 150 of the previous embodiment. The protective layer 613 is disposed on the reflective metallic layer 612 for preventing oxidation, and may be formed by magnesium fluoride ($MgF_2$) or silicon dioxide ($SiO_2$).

Figure 6E:
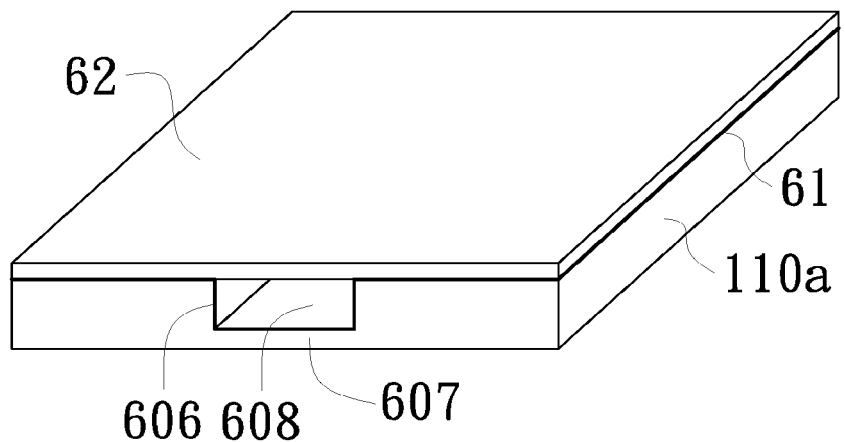
Figure 6F:
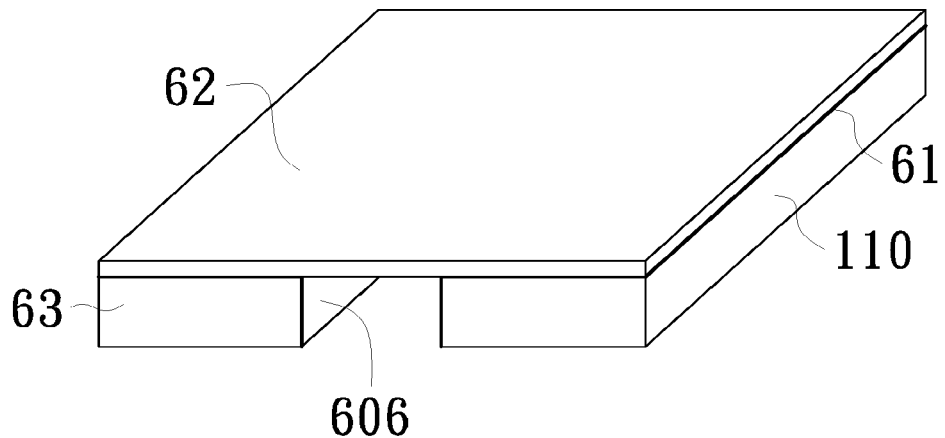

Referring now to FIGS. 6E and 6F. A fixing film 62 is adhered onto the reflective layer 61. Thereafter, the substrate 110a is ground to remove the bottom surface 607; that is, the second surface 118 of the substrate 110 is ground to separate the substrate 110a along the anisotropically etched trench 605 so as to obtain the substrate 110 or 120. Grinding of the substrate 110a may be chemical mechanical grinding.

Figure 6G:
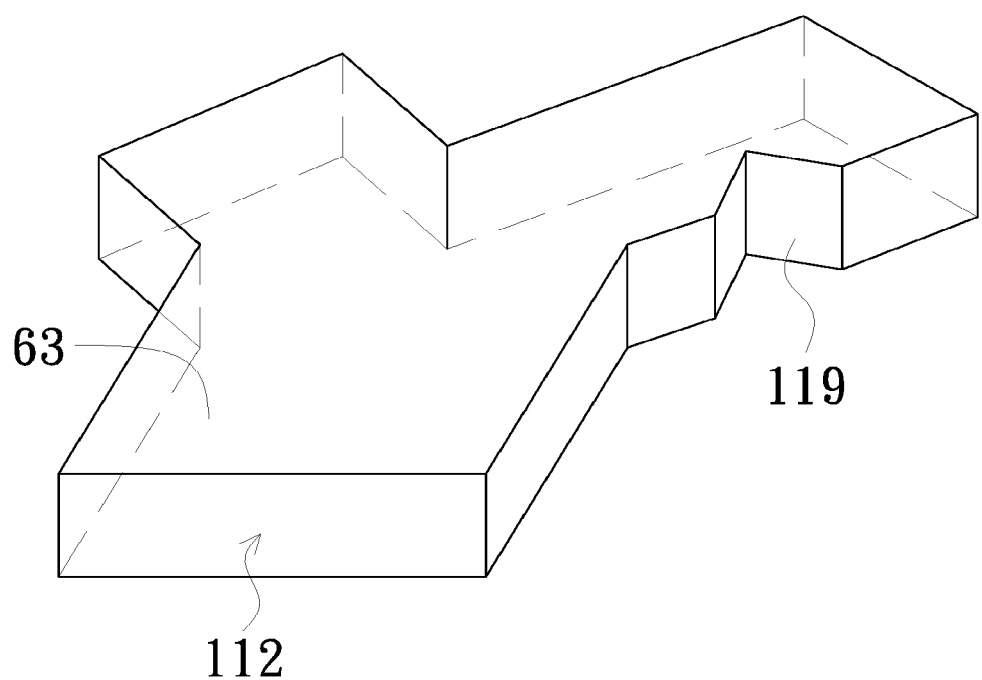

Referring now to FIG. 6G. A waveguide sheet 63 is obtained after the substrate 110a is ground. The waveguide sheet 63 as illustrated in FIG. 6G has positioning sides 112 for abutting optical components of the spectrometer (for example, the slit member 130, the grating 140 or the photo detector 180 or 1801) and stray light removal sides 119 adopted as a side of a stray light outlet.

It is to be noted that the waveguide sheet 63 shown in FIG. 6G may be fabricated according to a MEMS pattern, which includes at least one shape of the waveguide sheet. For example, the shape may correspond to the top contour of the waveguide sheet 63, and the MEMS pattern may correspond to the exposed portion 604 as illustrated in FIG. 6B. By utilizing the MEMS pattern, a single substrate 110a may be fabricated into a plurality of waveguide sheets 63, therefore facilitating mass production of waveguide sheets.

Figure 7A:
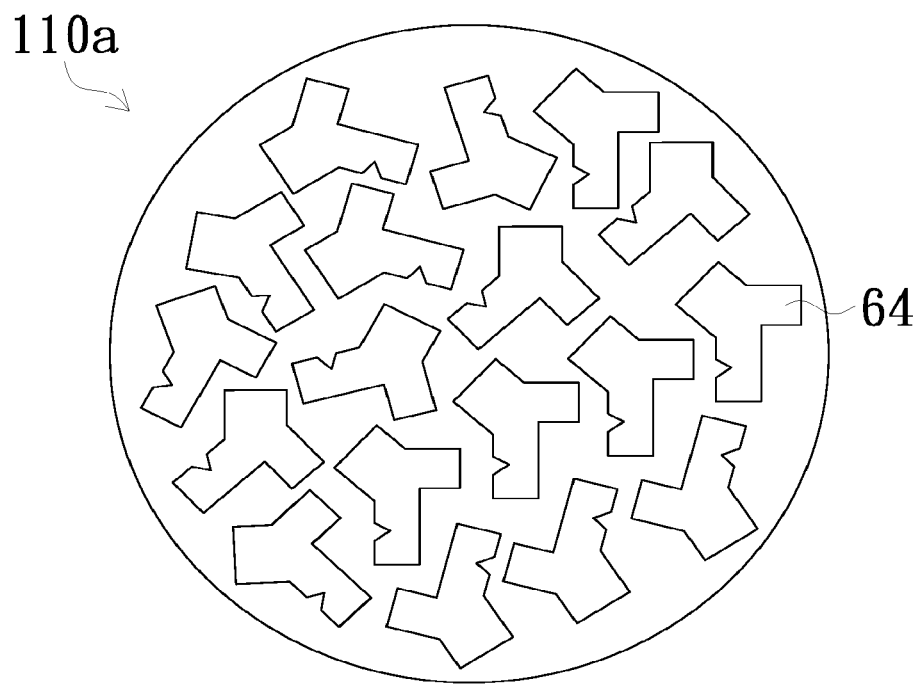
FIGS. 7A-7C are schematic views of a silicon wafer used as a substrate according to an embodiment of the present invention.
Figure 7B:
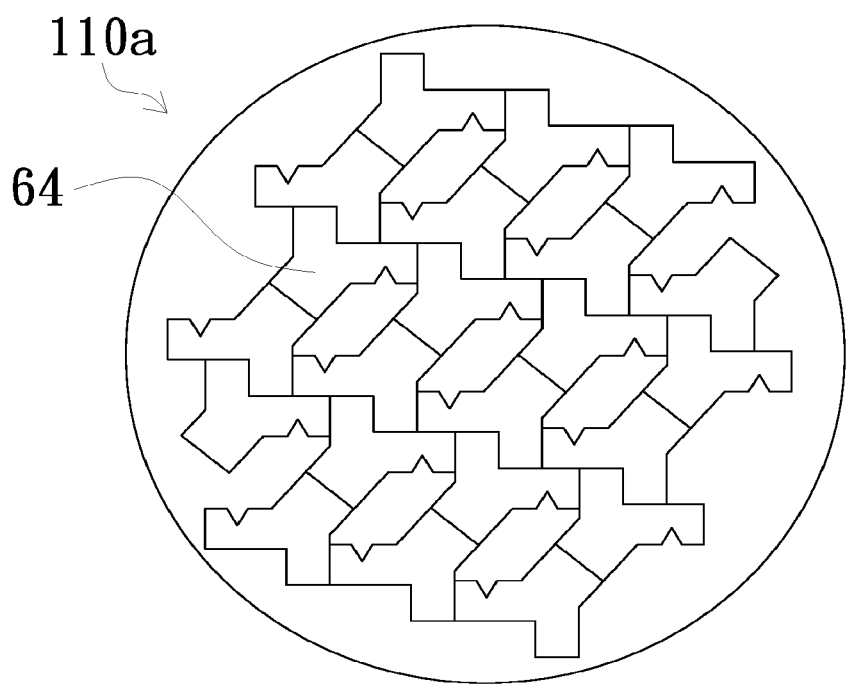
Figure 7C:
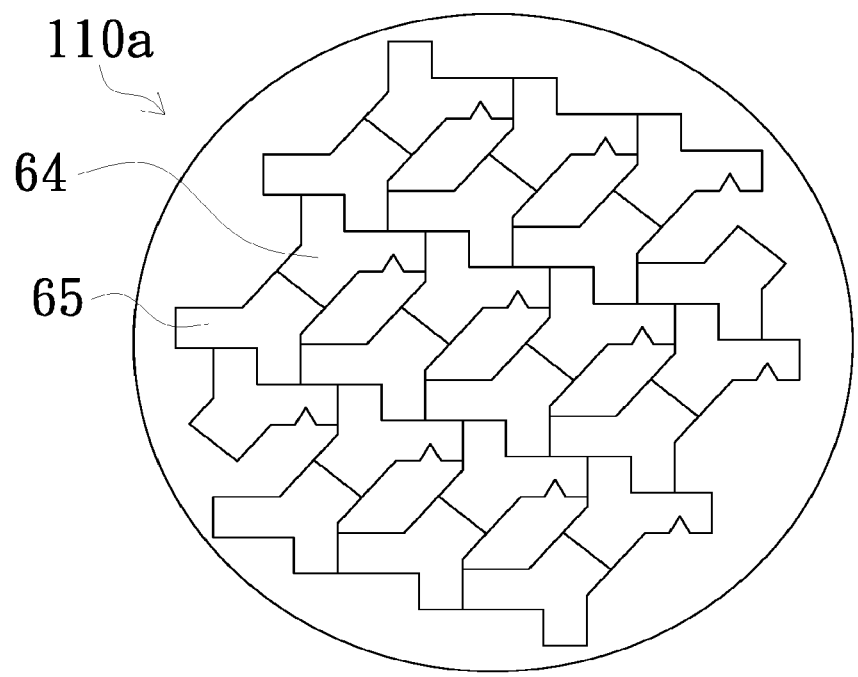

Referring now to FIGS. 7A to 7C, which illustrate three embodiments having different MEMS patterns. As shown in FIG. 7A and FIG. 7B, the MEMS patterns are designed on the substrate 110a and include a plurality of substantially identical waveguide sheet shapes 64. The shapes 64 of the waveguide sheet shown in FIG. 7A are separated from each other, whereas the shapes 64 in FIG. 7B are interconnected and share at least one edge.

Referring now to FIG. 7C. The MEMS pattern illustrated in FIG. 7C includes at least two different waveguide sheet shapes 64 and 65 that share at least one edge with each other. Each of the shapes 64 and 65 may be the shape of one of a pair of waveguide sheets for a spectrometer. Further, as the shapes of waveguide sheets illustrated in both FIGS. 7B and 7C (for example, the shapes 64 and 65) share at least one edge, the embodiments in FIGS. 7B and 7C could make use of the silicon wafer to the fullest, thus facilitating mass production of the waveguide sheets.

Figure 8:
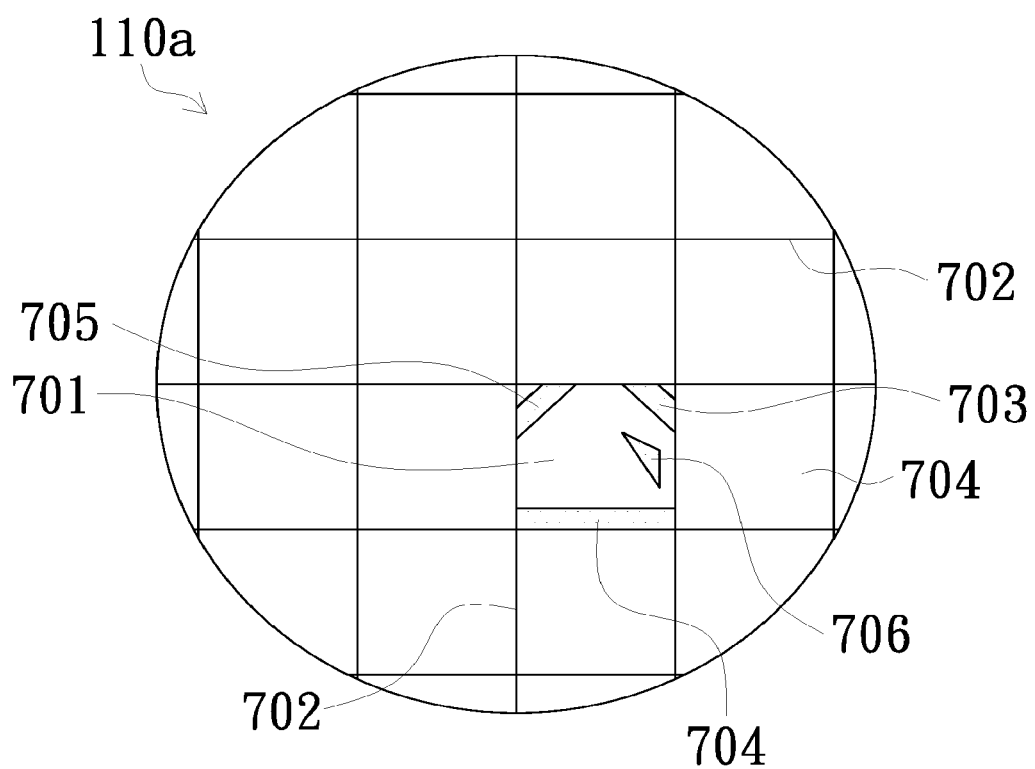
FIG. 8 is a schematic view of the division of area of a silicon wafer used as a substrate according to another embodiment of the present invention.
Figure 9:
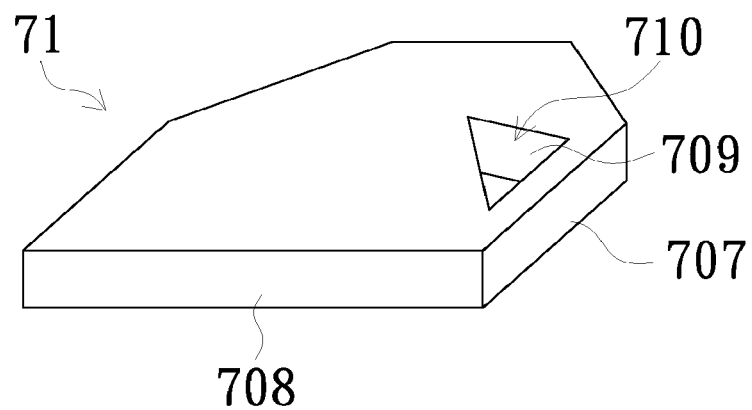
FIG. 9 is a perspective view of a waveguide sheet fabricated according to the other embodiment of the present invention.

Referring now to FIGS. 8 and 9, which illustrate a fabrication method of a spectrometer module (for example, a waveguide sheet) according to another embodiment of the present invention. The fabrication method of the present embodiment is similar to that of the aforementioned one; for example, the spectrometer module of the present embodiment is also fabricated by a MEMS process. Therefore, identical technical features, means and effects are not to be repeated herein. However, differences in the MEMS process adopted by the present and aforementioned embodiments are provided as follows.

As shown in FIG. 8, a substrate 110a is provided. The substrate 110a includes a plurality of areas 701 to be processed. Each of the areas 701 has precut lines 702 along the x- and y-axes. The areas 701 are disposed of a patterned mask layer (not shown in FIG. 8), which may be a photoresist layer or a hard mask. The areas 701 include partial patterns 703, 704, 705, and 706; the partial patterns 703-705 are adjacent to at least one cutline 702, while the partial pattern 706, which would be used to form a stray light outlet, does not have to be disposed adjacent to any cutline 702.

Thereafter, the substrate 110a is etched. That is, the partial patterns 703-706 are anisotropically etched so that the substrate 110a forms four anisotropically etched trenches along the partial patterns 703-706. In the present embodiment, the anisotropically etched trenches may be removed by grinding the bottom layer of the substrate 110, or the substrate 110 may be anisotropically etched all the way through to form four through openings. Timer sides of the through openings form the anisotropically etched surfaces, which may be used to contact the optical components for precise positioning or be adopted as stray light removal sides. After the etching, the areas 701 would still be connected by cutlines 702.

Thereafter, the patterned mask layer is removed, partially or entirely. A reflective layer is then formed on the substrate 110a; the reflective layer may be the reflective layer 61 shown in FIG. 6D. Thereafter, a fixing film (for example, the fixing film 62 or 160) may be adhered to the bottom layer of the substrate 110a. However, adhesion of the fixing film may be omitted if pattern distribution of the areas 701 (for example, the distribution as shown in FIG. 7A) allows the resulting waveguide sheets to stay organized and not fall apart randomly after dicing.

Referring now to FIGS. 8 and 9. The substrate 110a is diced along the cutlines 702 to separate the areas 701 into a plurality of waveguide sheets as illustrated in FIG. 9. The resulting waveguide sheet 71 shown in FIG. 9 is formed by dicing the substrate along the edges of the areas 701 (that is, along the cutlines 702), forming a plurality of diced surfaces 707 on the resulting waveguide sheet 71. As compared with those fabricated by MEMS, the diced surfaces 707 are less smooth and may be adopted as stray light removal sides. Such sides formed by dicing that could not be used as positioning sides are not aligned with the anisotropically etched surfaces formed by anisotropic etching that could be used as positioning sides along a straight line.

The waveguide sheet 71 fabricated by anisotropic etching according to the present embodiment includes a plurality of anisotropically etched surfaces 708 having a tolerance of 3 μm or smaller. The anisotropically etched surfaces 708 may be used for precise positioning of the optical components; and the opening formed along the partial pattern 706 may be used as a stray light outlet 710, with the inner sides thereof acting as stray light removal sides 709. This embodiment exemplifies the disposition of a stray light outlet using a single waveguide sheet. In addition, as the waveguide sheets 71 are connected by a fixing film, the waveguide sheets 71 would not randomly fall apart during dicing and could be separated by tearing off the fixing film at the end of the process.

Figure 10:
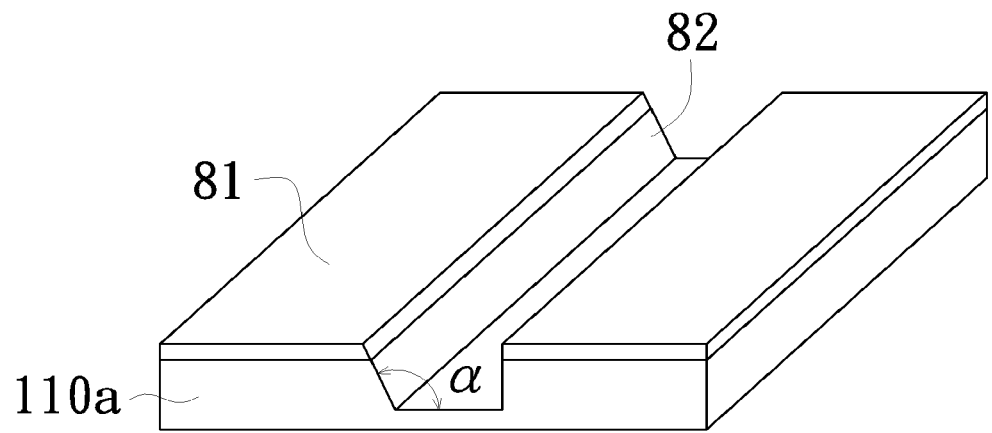
FIG. 10 is a perspective view of an anisotropically etched bevel fabricated according to an embodiment of the present invention.

Referring now to FIG. 10, which illustrates another structural feature of the waveguide sheet fabricated according to an embodiment of the present invention. As shown in FIG. 10, the portion of the substrate 110a not covered by the mask layer 81 is treated by a MEMS process to form an anisotropically etched bevel 82 having a bevel angle α larger or smaller than 90°. The anisotropically etched bevel 82 of the present embodiment may be used to abut beveled optical components.

By utilizing a single waveguide sheet for positioning optical components and for disposing a stray light outlet thereon, sensitivity and resolution of the spectrometer installed with the waveguide sheet of the aforementioned embodiments of the present invention are improved. However, other embodiments may adopt a pair of waveguide sheets, which are both fabricated by MEMS processes, simultaneously or separately, and may be comprised of different materials.

Figure 11A:
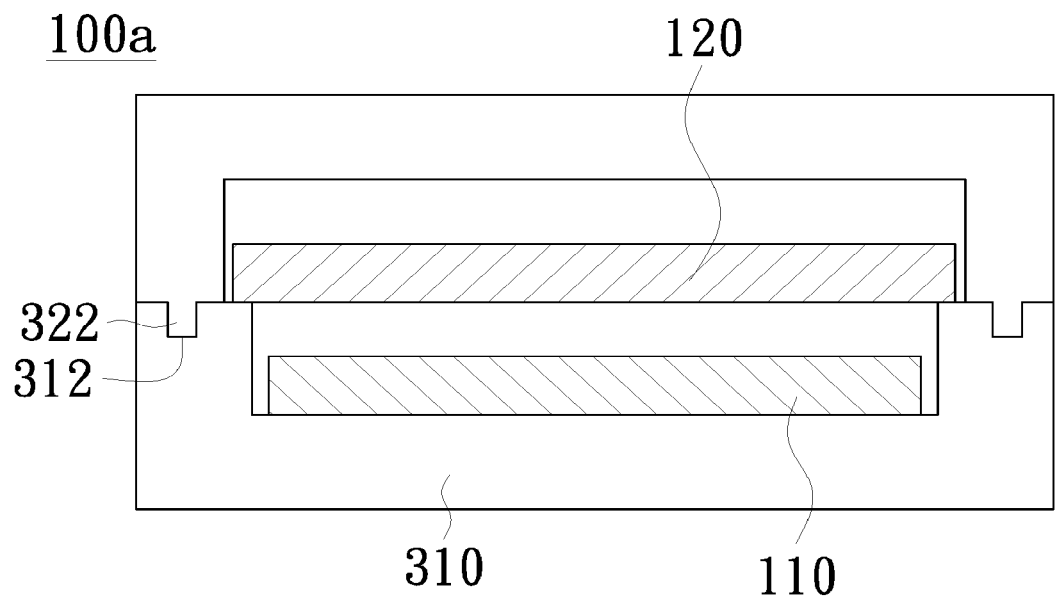
FIG. 11A is a cross-sectional view of a spectrometer module according to another embodiment of the present invention.
Figure 11B:
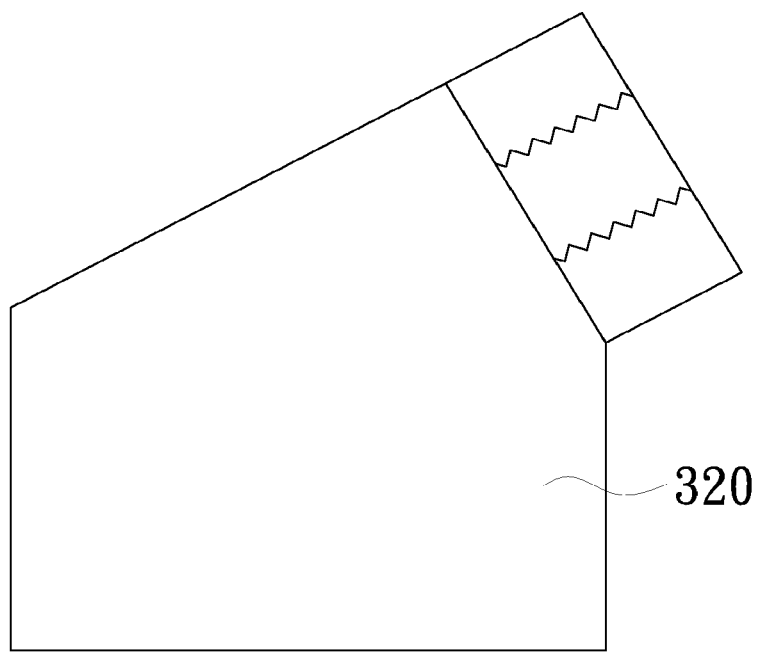
FIG. 11B is a top view of the substrate of the spectrometer module in FIG. 11A.

Referring now to FIG. 11A and FIG. 11B, which illustrate a cross-sectional view of a spectrometer module according to another embodiment of the present invention and a top view of the substrate of the spectrometer module. The spectrometer module 100a of the present embodiment is similar to the spectrometer module 100 shown in FIGS. 1A-1C; the difference between the two is provided as follows.

As shown in FIGS. 11A and 11B, the spectrometer module 100a includes the substrates 110 and 120 and substrates 310 and 320. The substrates 310 and 320 are the casing of the spectrometer; in other words, the substrates may include the waveguide sheet, the casing of the spectrometer, or the combination thereof. The substrate 310 may be fabricated by the MEMS process to form the optical components 312 (that is, the positioning structures) or other positioning sides; similarly, the substrate 320 may also be fabricated by the MEMS process to form the optical components 322 (that is, the positioning structures) or other positioning sides.

FIGS. 12A-12H illustrate the steps of the fabrication method of the spectrometer module according to another embodiment of the present invention. Similar to the aforementioned embodiment, the spectrometer module of the present embodiment is also fabricated by the MEMS process. Therefore, technical features, fabrication steps and effects that are identical to the aforementioned embodiments are not to be repeated herein.

Figure 12A:
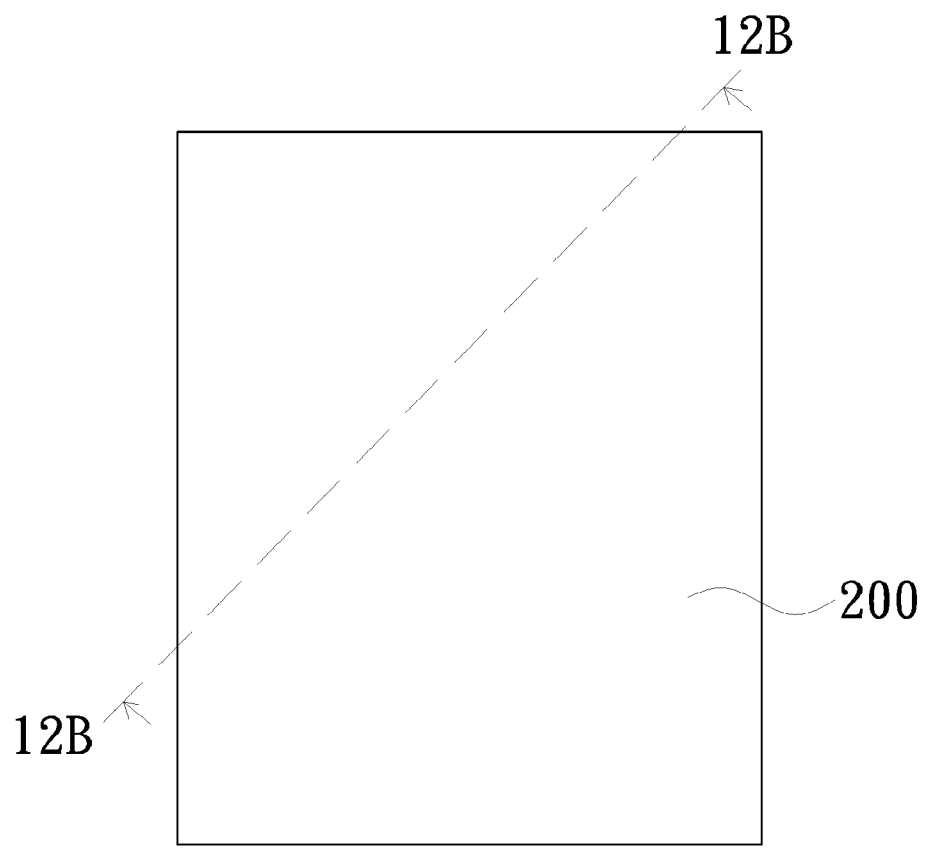
FIGS. 12A-12H are schematic views and cross-sectional views of the spectrometer module throughout the steps of the fabrication method of the spectrometer module according to another embodiment of the present invention.
Figure 12B:
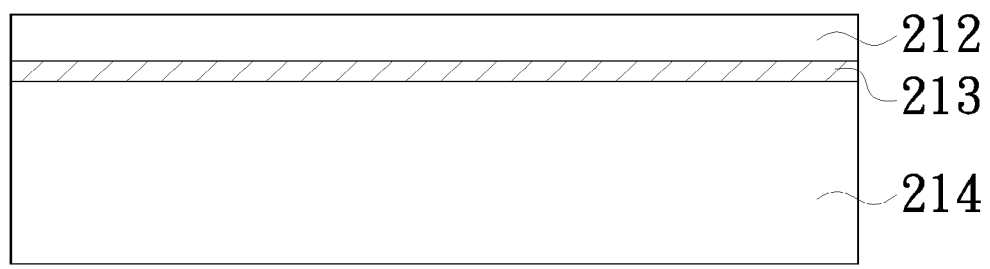

Referring now to FIGS. 12A and 12B. FIG. 12A illustrates the top view of a spectrometer module, and FIG. 12B shows the cross-sectional view of the spectrometer module along line 12B-12B. In the present embodiment, a multilayered composite substrate 200 is provided. Specifically, the substrate 200 is a silicon-on-insulator (SOI) substrate, and includes a first silicon layer 212, a second silicon layer 214, and an insulator layer 213 between the first silicon layer 212 and the second silicon layer 214. The insulator layer 213 may be silicon oxide, and the first and second silicon layers 212 and 214 may be comprised of monocrystalline or polycrystalline silicon.

The first silicon layer 212 and the second silicon layer 214 may have identical or different thickness. As exemplified in FIG. 12B, thickness of the first silicon layer 212 is smaller than that of the second silicon layer 214; therefore, the second silicon layer 214 may be used as the substrate to bear the optical components. Further, the substrate 200 may be formed by polishing both surfaces of the insulator layer followed by covering the polished surfaces with silicon, so as to reduce the chances of light scattering.

While the substrate 200 is rectangular in shape from the top view shown in FIG. 12A, the substrate 200 may also be a completely unmodified wafer; that is, the substrate 200 may be circular in shape. It is to be understood that the substrate 200 illustrated in FIG. 12A exemplifies the fabrication of a single spectrometer module. In the case where the substrate 200 is a complete piece of wafer, the substrate 200 may be fabricated into two or more spectrometer modules.

Figure 12C:
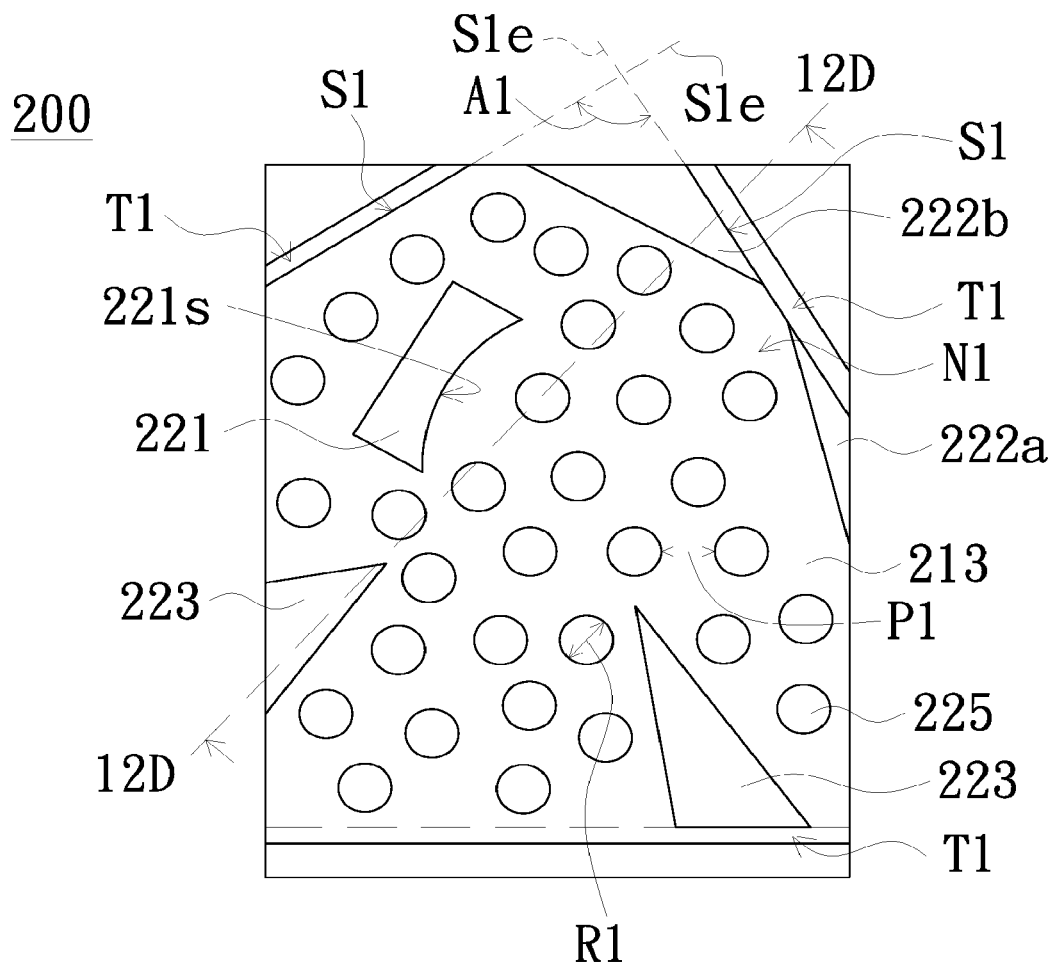
Figure 12D:
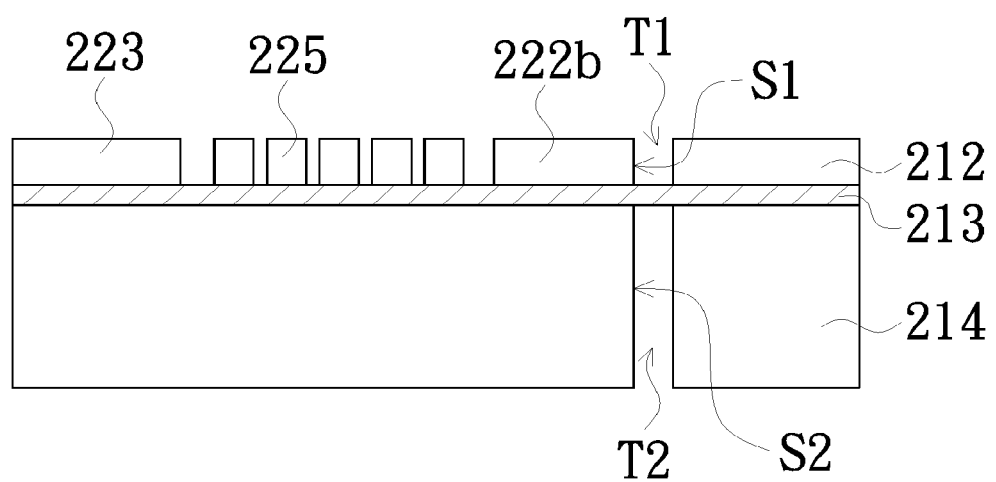

Referring now to FIGS. 12C and 12D, which illustrate the top view of the spectrometer module, and the cross-sectional view thereof along line 12D-12D. The MEMS process is performed to lithograph and etch the substrate 200 to form a plurality of optical components. More specifically, the first silicon layer 212 of the substrate 200 of the present embodiment is lithographed and etched to remove a portion of the first silicon layer 212 and expose a portion of the insulator layer 213, so as to form the optical components, including a grating 221 and spacers 222a, 222b and 223.

The grating 221 is a reflective diffraction grating. Diffraction surface 221s of the grating 221 may be concave cylindrical; the concave cylindrical surface may be cylindrically curved, parabolic cylindrical or freeform cylindrical (for example, as the concaved grating disclosed by U.S. Pat. No. 9,146,155). By utilizing such concaved diffraction surface 221s, the grating 221 is not only light dispersive, but may also output groups of spectral rays generated by light dispersion so that at least a portion of the spectral rays are converged onto the photo detector 280. Further, during the lithography process, a photoresist or hard mask may be adopted as the patterned mask layer and expose the area of the first silicon layer 212 to be removed afterwards.

In addition to forming the optical components, at least one trench T1 may also be formed by etching the first silicon layer 212. FIG. 12C illustrates three trenches T1 on the upper left, the upper right and the lower parts of the substrate 200. After formation of the optical components and the trenches T1, the second silicon layer 214 may be lithographed and etched to form another trench T2 as shown in FIG. 12D. The sidewalls S1 of the trenches T1 and the sidewall S2 of the trench T2 may be utilized positioning sides afterwards.

The trench T1 may be aligned with the trench T2 so that the sidewalls S1 and S2 thereof are aligned. The broken lines on the lower portion of FIG. 12C indicate the sidewall S2 of the trench T2 to which the trench T1 at the lower part aligns. Further, in the embodiment illustrated in FIG. 12C, the sidewalls S1 of the two trenches T1 on the upper left and right are both planar, and extension planes S1e of the sidewalls S1 are not parallel to each other, thus forming an angle A1 of preferably between 90° and 180°.

The spacers 222a, 222b and 223 are adopted for supporting the waveguide sheet during assembly of the spectrometer module, and may also function to block stray lights. In the present embodiment, a slit may be formed between the spacers 222a and 222b for incident lights to pass through. In other embodiments, the slit may be disposed in front of the photo detector (for example, photo detector 170) for spectral rays formed by the grating 221 to pass through. Alternatively, two slits may be formed between two spacers 222a and between two spacers 222b; one of the slits may be used for allowing incident lights to pass through, while the other may be used for allowing the spectral rays to pass through.

In the present embodiment, etching of the substrate 200 may be anisotropic etching, such as electron beam etching or ion etching. The ion etching may be reactive ion etching (RIE) or deep reactive ion etching (DRIE). The sidewalls S1 and S2 formed by such anisotropic etching (for example, electron beam etching or ion etching) may be substantially perpendicular to the surface of the insulator layer 213. When the substrate 200 is etched by ion etching, width of the etched openings on the first silicon layer 212 (that is, the open ratio) would affect the etching rate. Consequently, when the first silicon layer 212 is lithographed and etched to remove a portion of the first silicon layer 212, a meshed pattern N1 is formed on the remaining first silicon layer 212 to minimize the difference in etching rate throughout the first silicon layer 212.

In the embodiment illustrated in FIG. 12C, the meshed pattern N1 is trenched and exposes the insulator layer 213. The meshed pattern N1 also defines a plurality of islands 225, each of which is surrounded by the meshed pattern N1. The islands 225 are formed by lithography and etching; therefore, the islands 225, the grating 221, the spacers 222a, 222b and 223 and the trenches T1 are formed substantially simultaneously.

Among the islands 225, the pitches P1 between any two adjacent islands 225 are substantially constant, so as to ensure consistent etching rates throughout the first silicon layer 212. In the embodiment shown in FIG. 12C, all of the islands 225 are cylindrical in shape; however, the shapes of the islands in other embodiments may be prismatic, such as cuboidal, cubic or hexagonal prismatic. Meanwhile, the meshed pattern N1 may be beehive shaped or latticed. Width R1 of each of the islands 225 is small, ranging between approximately 100-1000 μm; as compared with the grating 221 and the spacers 222a, 222b and 223, each of the islands 225 occupies a relatively small area on the insulator layer 213.

Figure 12E:
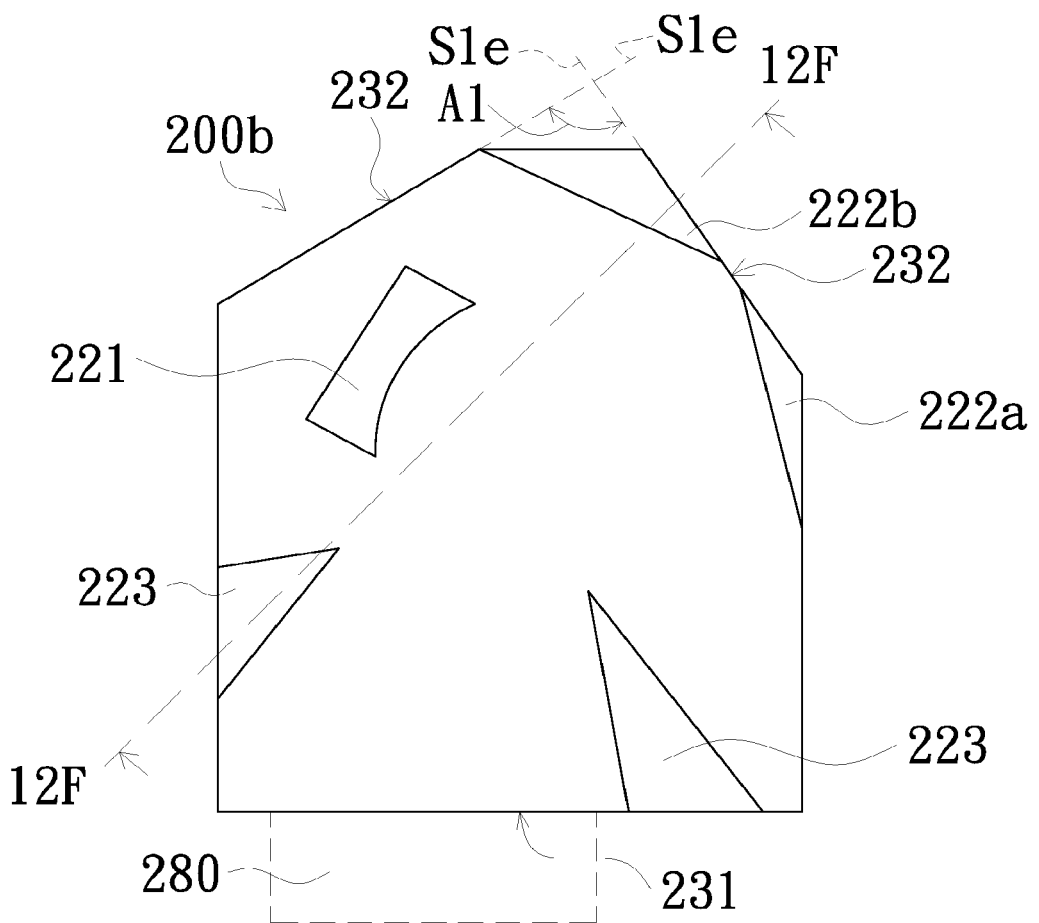
Figure 12F:
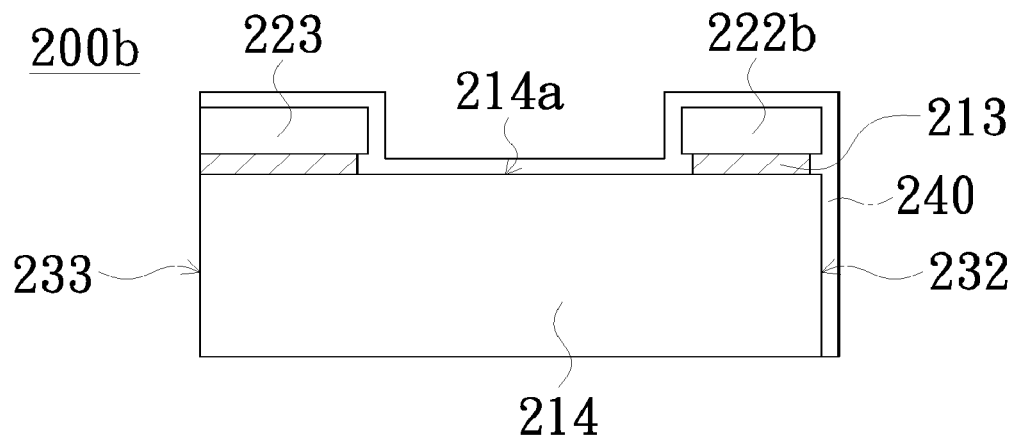

Referring now to FIGS. 12E and 12F, which illustrate the top view of the spectrometer module, and the cross-sectional view thereof along line 12F-12F. The insulator layer 213 is etched. Different from the method adopted to etch the first silicon layer 212 and the second silicon layer 214, the insulator layer 213 is treated by wet etching. Etchant for the wet etching may be hydrogen fluoride (HF) or solutions containing HF. Such etchant could dissolve the insulator layer 213 comprised of silicon oxide.

As the width R1 of each of the islands 225 ranges between approximately 100 μm to 1000 μm, area occupied by each of the islands 225 on the insulator layer 213 is smaller than those occupied by a single optical component (for example, the grating 221 or the spacers 222a, 222b and 223). Therefore, the islands 225 would be removed when the insulator layer 213 is etched, thus removing the meshed pattern N1 and exposing the surface 214a of the second silicon layer 214.

The insulator layer 213 underneath the grating 221 and the spacers 222a, 222b and 223 would also be dissolved by the etchant. However, as each of the optical components occupies a relatively large area on the insulator layer 213, the insulator layer 213 underneath the optical components would not be completely removed if not etched for a prolonged period of time. Consequently, the insulator layer 213 covered by the grating 221 and the spacers 222a, 222b and 223 would retract from the sides of the grating 221 and the spacers 222a, 222b and 223; in other words, the grating 221 and the spacers 222a, 222b and 223 would protrude over the edges of the insulator layer 213.

Lithography is not required for etching the insulator layer 213, and the remaining first silicon layer 212 may be used as hard masks for etching the insulator layer 213. After the insulator layer 213 is etched, the aligned sidewalls S1 and S2 of the trenches T1 and T2 form positioning sides 231 and 232. As exemplified in FIGS. 12C-12F, a surface of positioning side 232 would be formed by the side (that is, the sidewall S1) of at least one optical component (that is, the spacer 222b) and the side (that is, the sidewall S2) of the second silicon layer 214.

It is to be understood that while the positioning sides 231 and 232 of the embodiment as illustrated in FIGS. 12C-12F are formed by the sides of the optical components (that is, the first silicon layer 212) and the second silicon layer 214, the positioning sides in other embodiments may be formed by the side of one of the first silicon layer 212 and the second silicon layer 214. In other word, the positioning sides 231 and 232 may be formed by the side of a single silicon layer (that is, the first silicon layer 212 or the second silicon layer 214), and are not necessarily formed by the sides of both of the first and second silicon layers 212 and 214 as exemplified in FIGS. 12C-12F.

As the extension planes S1e of the sidewalls S1 of two trenches T1 form the angle A1 and the positioning side 232 is formed by the sidewalls S1 and S2, the extension planes of two positioning sides 232 are two extension planes S1e; that is, the extension planes S1e of two positioning sides 232 form a substantially 90° angle or an angle A1 of 90° to 180°. In the embodiment illustrated in FIG. 12E, the positioning sides 232 are for facilitating the subsequent assembly, and the positioning side 231 is for the photo detector 280 to abut against so that the photo detector 280 is precisely positioned. The photo detector 280 may be the photo detector 180 or 1801 as in the previous embodiments.

Referring now to FIG. 12F. A reflective layer 240 may be formed on the grating 221, the spacers 222a, 222b and 223, and the surface 214a of the second silicon layer 214. Method of formation and structural composition of the reflective layer 240 may be identical to those of the reflective layer 61. That is, the reflective layer 240 may be a multilayered film formed by CVD or PVD; and the PVD may involve evaporation or sputtering. The reflective layer 240 may also be a single layered metal film. Further, the reflective layer 240 may conformally cover the grating 221 and the spacers 222a, 222b and 223.

After disposition of the reflective layer 240, a spectrometer module 200b including the reflective layer 240, at least one substrate and at least one optical component is obtained, as illustrated in the embodiment in FIG. 12F. In the present embodiment, the spectrometer module 200b includes only one substrate comprised of the second silicon layer 214 and the insulator layer 213, and a plurality of optical components, including the gratin 221 and the spacers 222a, 222b and 223 formed by treating the first silicon layer 212 by a MEMS process. In contrast, the spectrometer module 220b in other embodiments may have a plurality of substrates and only one optical component.

While the insulator layer 213 is disposed on and covers the second silicon layer 214, a portion of the second silicon layer 214 is exposed. Specifically, the insulator layer 213 shown in FIG. 12F is a patterned layer that does not cover the entire silicon layer 214. As illustrated in FIG. 12F, the grating 221 and the spacers 222a, 222b and 223 are both formed on the insulator layer 213; the insulator layer 213 is formed between the second silicon layer 214 and the optical components (for example, the grating 221 and the spacers 222a, 222b and 223); and the optical components are in contact with the insulator layer 213 but not the second silicon layer 214.

The reflective layer 240 covers the second silicon layer 214 and at least one of the optical components (for example, the grating 221 and the spacers 222a, 222b and 223). In the spectrometer module 200b, the grating 221, the spacers 222a, 222b and 223, and the insulator layer 213 are all disposed on the surface 214a of the second silicon layer 214; whereas the reflective layer 240 covers at least one of the optical components (for example, the grating 221 and the spacers 222a, 222b and 223) and the surface 214a, and may be adopted as the reflective layer of the resulting waveguide sheet.

Further, in the case where the substrate 200 is an entire wafer, the substrate 200 may be diced along the contour of the substrate 200 (for example, the rectangular contour of the substrate 200 as shown in FIG. 12C) to form a plurality of spectrometer modules 200b after formation of the reflective layer 240. As the substrate 200 is diced after the reflective layer 240 is formed and the side 233 in FIG. 12F is formed by dicing, the side 233 is not covered by the reflective layer 240 as illustrated in FIG. 12F.

It is to be understood that the spectrometer module 200b of the embodiment illustrated in FIG. 12F does not necessarily include the reflective layer 240. More specifically, although the surface 214a of the second silicon layer 214 is initially in contact with the insulator layer 213, the surface 214a is a substantially smooth surface, similar to a polished surface; in addition, the first silicon layer 212 has a good reflection rate as it may be formed of monocrystalline silicon. Therefore, even though the grating 221, the spacers 222a, 222b and 223, and the second silicon layer 214 are not covered by the reflective layer 240, the spectrometer module 200b is still highly reflective. Likewise, the spectrometer modules 200b of other embodiments do not necessarily include the reflective layer 240 either.

Figure 12G:
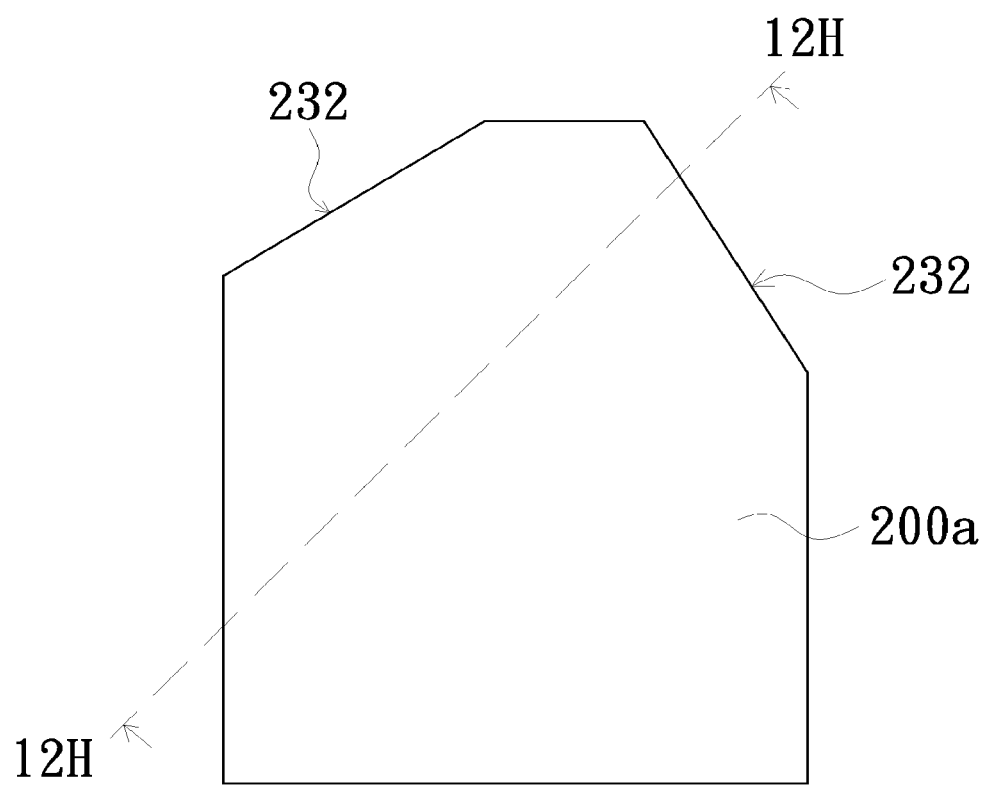
Figure 12H:
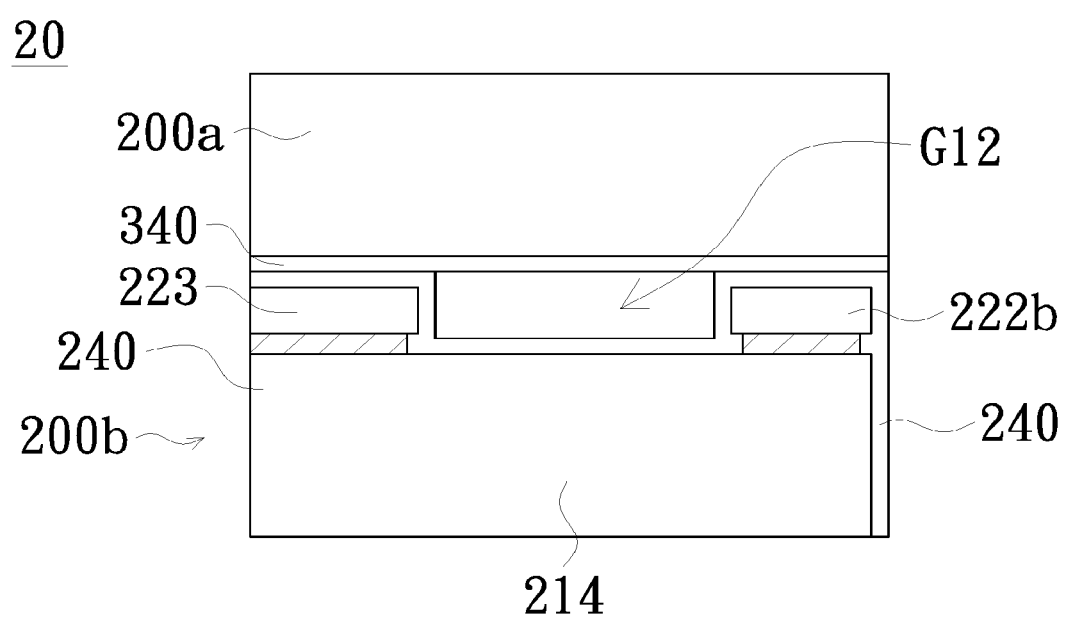

Referring now to FIGS. 12G and 12H, which illustrate the top view of the spectrometer module, and the cross-sectional view thereof along line 12H-12H. After completion of the spectrometer module 200b, another spectrometer module 200a may be assembled onto the spectrometer module 200b. As shown in FIG. 12G, the spectrometer module 200a may be planar in shape, and portions of the edges of the spectrometer module 200a may be aligned with the positioning sides 232 of the spectrometer module 200b. The spectrometer module 200a is fabricated by a MEMS process, and may be obtained from a silicon wafer, a silicon-on-insulator (SOI) substrate, a metallic plate or a sapphire substrate as described in the previous embodiments.

As the extension planes S1e of two positioning sides 232 form the angle A2 (as illustrated in FIG. 12E) and portions of the edges of the spectrometer module 200b may align with the positioning sides 232, the spectrometer modules 200a and 200b may be positioned by a groove having two intersecting planes during assembly the spectrometer modules. For example, when the angle A1 is substantially 90°, a housing or fixture having two perpendicularly intersecting inner planes may be utilized to abut a portion of the edges of the spectrometer modules 200a and 200b (for example, the positioning sides 232), so that the portions of the edges of the spectrometer modules 200a and 200b are aligned, thus facilitating assembly of the spectrometer module 200a onto the correct position.

After assembly of the spectrometer module 200a with the spectrometer module 200b, a bare machine 20 of the spectrometer is obtained. The bare machine 20 includes a grating, and may thus disperse lights. In the bare machine 20, the spacers 222a, 222b and 223 support the spectrometer module 200b so as to space the spectrometer modules 200a and 200b apart and form a gap G12 therebetween. The spectrometer module 200a includes a reflective layer 340 facing the reflective layer 240. Consequently, incident lights and spectral rays generated by the grating 221 may reflect between the reflective layers 240 and 340 and be transmitted within the gap G12. Therefore, the bare machine 20 may perform the basic optical functions of a spectrometer.

It is to be understood that as the spectrometer module 200a may be made of a silicon wafer, the spectrometer module 200a is highly light reflective even without the reflective layer 340. Therefore, the other embodiments, the spectrometer modules 200a do not necessarily include the reflective layer 340. Additionally, while all of the optical components (for example, the grating 221 and the spacers 222a, 222b and 223) of the present embodiment are formed on the second silicon layer 214 of the spectrometer module 200b but not on the spectrometer module 200a, other embodiments may have the grating 221 and the spacers 222a, 222b and 223 separately form on the spectrometer modules 200a and 200b; for example, forming the grating 221 and a plurality of spacers 223 on the spectrometer module 200b, and forming the spacers 222a and 222b on the spectrometer module 200a. In other words, the plurality of optical components need not be formed on a single waveguide sheet, and may be separately formed on two waveguide sheets.

Figure 13:
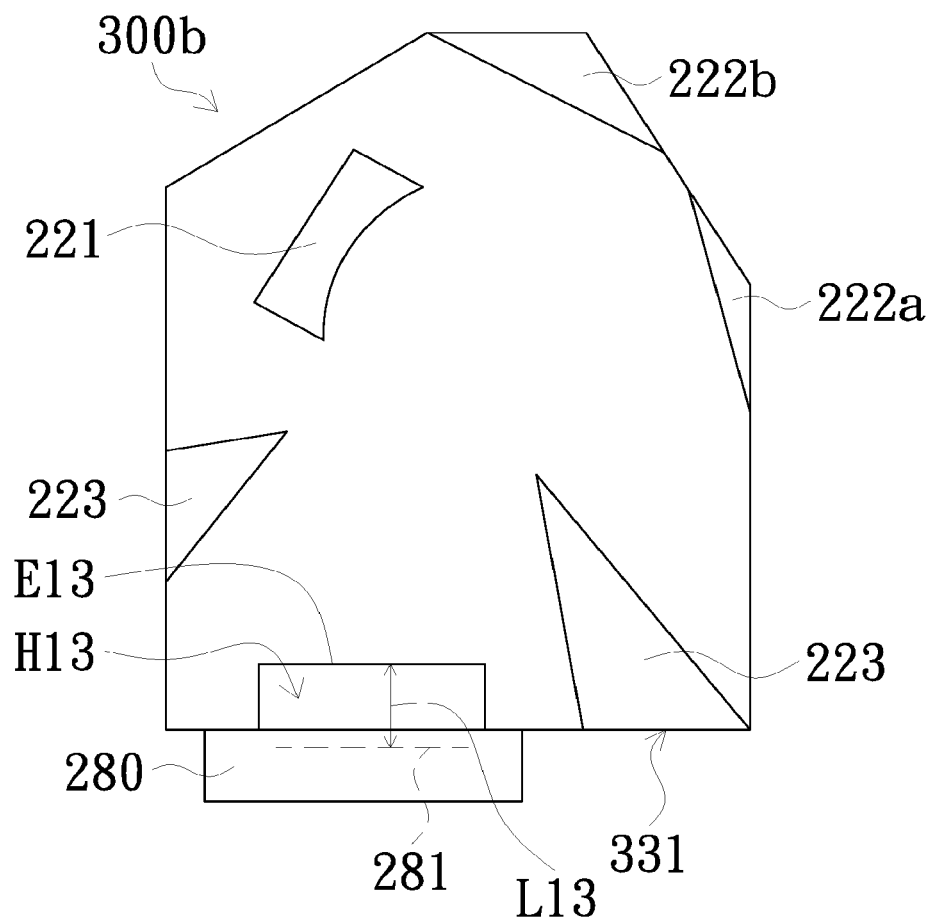
FIG. 13 is a top view of the spectrometer module according to the other embodiment of the present invention.

Referring now to FIG. 13, which illustrates a top view of the spectrometer module according to the other embodiment of the present invention. Structure and fabrication method of the spectrometer module 300b shown in FIG. 13 are similar to those of the spectrometer module 200b; for example, the spectrometer module 300b also includes the grating 221 and the spacers 222a, 222b and 223. The difference between the spectrometer modules 300b and 200b is the diverging opening H13.

More specifically, as the diffraction surface 221s of the grating 221 is concave cylindrical, the grating 221 is capable of focusing lights only along a single direction (for example, along the horizontal direction), therefore causing astigmatism of the image generated by the grating 221 and measurement distortion of the photo detector 280. Such astigmatism would lead to a "tailing effect" that reduces resolution; and such tailing effect has been described in the first paragraph on page 90 and FIG. 7-3 on page 94 of *Diffraction Grating Handbook*, $6^{th}$ edition, authored by Christopher Palmer at Newport Corporation.

To overcome the issues caused by astigmatism, the spectrometer module 300b may include the positioning side 331 and the diverging opening H13 formed at the positioning side 331. The diverging opening H13 is disposed on the intended optical path of the spectrometer, and may be disposed on the extension plane of the substrate 110a onto which the intended optical path projects (for example, the second silicon layer 214 and the insulator layer 213 shown in FIG. 12F). The diverging opening H13 is an open opening, and may be formed by etching the first silicon layer 212, the second silicon layer 214 and the insulator layer 213 sequentially (referring to FIGS. 12B and 12D). As shown in FIG. 13, edges of the diverging opening H13 are connected to the positioning side 331. The diverging opening H13 includes a light output edge E13 facing the photo detector 280. When the photo detector 280 abuts the positioning side 331, the light output edge E13 and the light reception surface (not illustrated) of the photo detector 280 would be spaced apart for a distance L13.

The plurality of spectral rays generated by the grating 221 would incident from the light output edge E13 to the photo detector 280. When lights are output from the light output edge E13 to the photo detector 280, lights would diffuse from the light output edge E13, increasing the area of projection on the photo detector 280, which could reduce the negative effects caused by astigmatism and maintain or even improve the precision of measurements by the spectrometer. The diverging opening H13 may also direct lights of large diverging angle out of the spectrometer, so as to prevent those lights from entering the photo detector 280.

Figure 14:
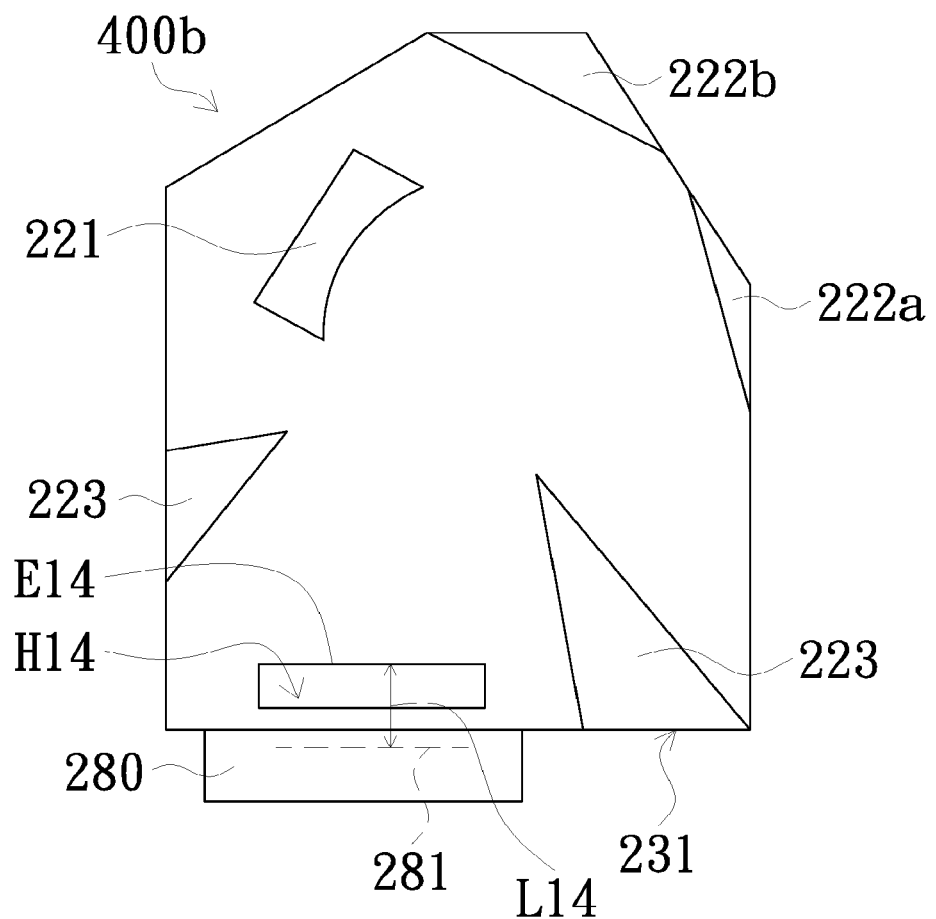
FIG. 14 is a top view of the spectrometer module according to yet another embodiment of the present invention.

Referring now to FIG. 14, which illustrates a top view of the spectrometer module according to yet another embodiment of the present invention. Structure of the spectrometer module 400b shown in FIG. 14 is similar to that of the spectrometer module 300b of the previous embodiment, and fabrication method of the spectrometer module 400b is similar to that of the spectrometer module 200b of the aforementioned embodiment. The difference between the spectrometer modules 300b and 400b is that the diverging opening H14 shown in FIG. 14 is a closed opening not connected to the positioning side 331.

When the photo detector 280 abuts the positioning side 231, light output edge E14 of the diverging opening H14 and the light reception surface (not illustrated) of the photo detector 280 would also be spaced apart for a distance L14. Therefore, lights may also diffuse from the light output edge E14, thus increasing the area of projection on the photo detector 280 and preventing lights of large diverging angle from entering the photo detector 280, so that the negative effects caused by astigmatism are reduced. It is to be understood that the diverging openings H13 and H14 shown in FIGS. 13 and 14 may be applied to the embodiments shown in FIG. 1A through FIG. 11B; that is, the spectrometer modules of the aforementioned embodiments may also include the diverging opening H13 or H14 to reduce the effect of astigmatism. Likewise, in other embodiments, the spectrometer module 400b in FIG. 14 may also include the diverging opening H13 shown in FIG. 13, so that the spectrometer module 400b includes more than one diverging opening (for example, having both of the diverging openings H13 and H14).

Figure 15A:
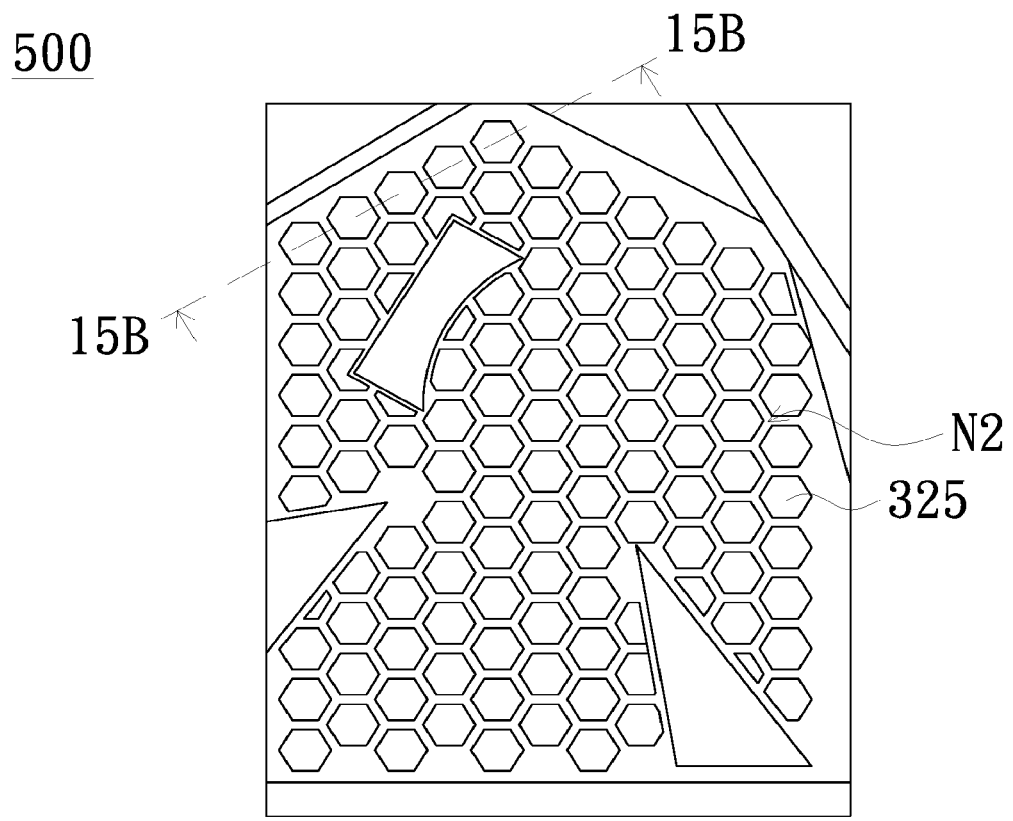
FIGS. 15A and 15B are schematic view and cross-sectional view of the spectrometer module fabricated according to another embodiment of the present invention.
Figure 15B:
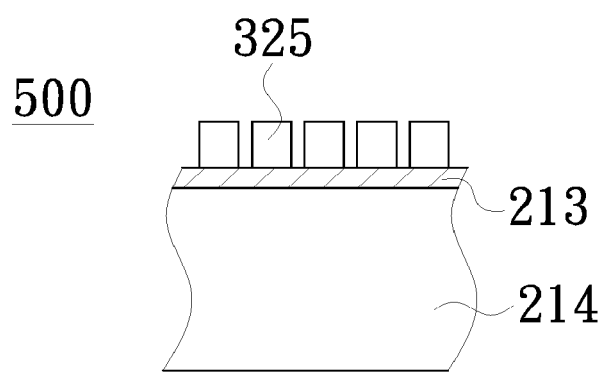
Figure 16:
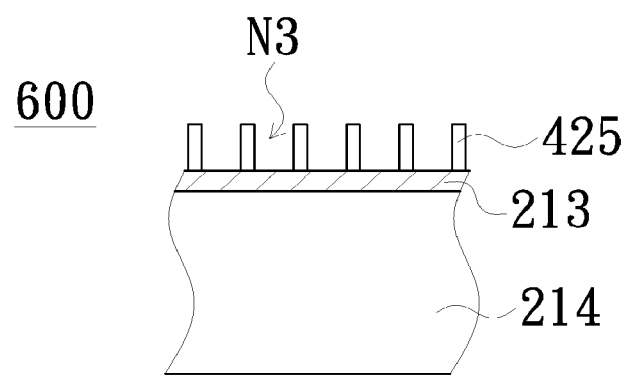
FIG. 16 is a cross-sectional view of a meshed pattern formed by the fabrication method of the spectrometer module according to another embodiment of the present invention.

Referring now to FIG. 15A, FIG. 15B and FIG. 16. FIGS. 15A and 15B illustrate the fabrication method of the spectrometer module according to another embodiment of the present invention, and FIG. 16 illustrates a cross-sectional view of a meshed pattern formed by the fabrication method of the spectrometer module according to another embodiment of the present invention. The two embodiments illustrated in FIGS. 15A-15B and FIG. 16 are similar to the aforementioned embodiments; therefore, identical technical features are not to be repeated, and the main differences are provided as follows.

Referring now to FIG. 15A and FIG. 15B. FIG. 15B is the cross-sectional view of the spectrometer module in FIG. 15A along line 15B-15B. As shown in FIGS. 15A and 15B, the meshed pattern N2 of the spectrometer module 500 is beehive shaped. The meshed pattern N2 is a trench that exposes the insulator layer 213 and defines a plurality of islands 325. Consequently, as illustrated in FIG. 15A, each of the islands 325 is hexagonal in shape and surrounds by the meshed pattern N2.

Referring now to FIG. 16. In the spectrometer module 600 illustrate in FIG. 16, top view of the meshed pattern 425 is similar to that of the meshed pattern N2 shown in FIG. 15A; that is, the meshed pattern 425 is also of a beehive shape. However, the meshed pattern 425 shown in FIG. 16 is in fact completely opposite to the meshed pattern N2. Specifically, the meshed pattern 425 is a protruded layer only partially covering the insulator layer 213. The meshed pattern 425 includes a plurality of openings N3 that exposes the insulator layer 213. The openings N3 are each hexagonal in shape, and are disposed in a beehive shaped arrangement. Therefore, association between the shapes of the meshed patterns 425 and N2 are similar to that between an astatic printing and gravure printing. In the present embodiment, a trench or groove (not illustrated) may be formed between the meshed pattern 425 and the optical components (for example, the grating 221 and the spacers 222a, 222b and 223) to ensure disconnection between the meshed pattern 425 and the optical components, thus avoiding damage of the optical components while removal of the meshed pattern 425 during etching of the insulator layer 213.

In sum, the spectrometer module and fabrication method thereof according to the embodiments of the present invention utilizes MEMS processes to form at least one positioning side and at least one optical component on a single substrate, therefore effectively improving positioning precision of the spectrometer module and promoting structural and positional precision of the optical components. On the contrary, conventional machining tends to cause electro-spark erosion and generate burrs and unsmooth sides, significantly affecting positioning precision and leading to a tolerance of approximately 20 μm to 30 μm. Therefore, as compared with conventional machining, the MEMS process adopted by the embodiments of the present invention effectively advances the overall precision of the spectrometer module.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fabrication method of a spectrometer module, comprising:
   providing at least one substrate; and
   forming at least two optical components of the spectrometer on the at least one substrate by a microelectromechanical systems (MEMS) process;
   wherein the substrate has a first surface and a second surface opposite to the first surface, and the MEMS process comprises:
   etching the substrate from the first surface to form at least one depression on the substrate, wherein the depression is not exposed from the second surface;
   forming a patterned mask layer on the first surface;
   forming a reflective layer on the first surface and covering the patterned mask layer; and
   grinding the substrate from the second surface to spatially communicate the second surface with the first surface through the depression.

2. The fabrication method according to claim 1, wherein one of the at least two optical components is an edge for light transmission.

3. The fabrication method according to claim 1, wherein one of the at least two optical components comprises a patterned mask layer and a reflective layer covering the patterned mask layer.

4. The fabrication method according to claim 1, wherein one of the at least two optical components comprises an electrocasting patterned layer and a reflective layer covering the electrocasting patterned layer.

5. The fabrication method according to claim 1, wherein the MEMS process further comprising:
adhering a fixing film on the first surface prior to grinding the substrate from the second surface, wherein the fixing film passes over the depression.

6. The fabrication method according to claim 1, wherein the substrate is a silicon-on-insulator (SOI) substrate and comprises a first silicon layer, a second silicon layer and an insulator layer between the first silicon layer and the second silicon layer.

7. The fabrication method according to claim 6, wherein the first silicon layer is lithographed and etched to remove a portion of the first silicon layer and expose the insulator layer, so as to form a plurality of the optical component and at least one first trench.

8. The fabrication method according to claim 7, wherein the second silicon layer is lithographed and etched to form at least one second trench, and the second trench on the second silicon layer is aligned with the first trench on the first silicon layer.

9. The fabrication method according to claim 6, wherein a meshed pattern is formed after the first silicon layer is lithographed and etched.

10. The fabrication method according to claim 9, wherein the meshed pattern is a groove exposing the insulator layer and defining a plurality of islands surrounded by the meshed pattern.

11. The fabrication method according to claim 9, wherein the meshed pattern is a protruded layer covering the insulator layer and has a plurality of openings exposing the insulator layer.

12. The fabrication method according to claim 9, wherein the insulator layer is wet etched after the first silicon layer is lithographed and etched to remove the meshed pattern and a portion of the insulator layer.

13. The fabrication method according to claim 12, wherein a surface of the second silicon layer is exposed after the meshed pattern and the portion of the insulator layer are removed, and the surface of the second silicon layer contacts the insulator layer and is adopted as a reflective surface of a waveguide sheet.

14. The fabrication method according to claim 1, further comprising:
forming at least one stray light removal side on the substrate, wherein the stray light removal side is disposed outside of an intended optical path of the spectrometer.

15. A spectrometer module, comprising:
a plurality of substrates;
at least two optical components of the spectrometer module formed on at least one of the plurality of substrates; and
a reflective layer, covering the at least two optical components;
wherein the at least two optical components are fabricated by a microelectromechanical systems (MEMS) process, the at least one of the plurality of substrates has a first surface and a second surface opposite to the first surface, and the MEMS process comprising the following step of:
etching the substrate from the first surface to form at least one depression on the substrate, wherein the depression is not exposed from the second surface;
forming a patterned mask layer on the first surface;
forming the reflective layer on the first surface, and covering the patterned mask layer; and
grinding the substrate from the second surface to spatially communicate the second surface with the first surface through the depression.

16. The spectrometer module according to claim 15, wherein one of the at least two optical components is an edge for light transmission.

17. The spectrometer module according to claim 15, wherein the plurality of substrates are two substrates facing each other, at least one of the at least two optical components spaces the two substrates apart to form a gap between the two substrates.

18. A spectrometer, comprising:
a spectrometer module, comprising:
at least one substrate;
at least one edge formed on the at least one substrate for light transmission;
at least one optical component of the spectrometer formed on the at least one substrate; and
a reflective layer, covering the at least one optical component and the at least one edge; and
a photo detector for receiving light from the spectrometer module;
wherein the at least one optical component and the at least one edge are fabricated by a microelectromechanical systems (MEMS) process, the at least one substrate has a first surface and a second surface opposite to the first surface, and the MEMS process comprising the following step of:
etching the at least one substrate from the first surface to form at least one depression on the at least one substrate, wherein the depression is not exposed from the second surface;
forming a patterned mask layer on the first surface;
forming the reflective layer on the first surface, and covering the patterned mask layer; and
grinding the at least one substrate from the second surface to spatially communicate the second surface with the first surface through the depression.

19. The spectrometer according to claim 18, wherein the at least one optical component comprises a grating and at least one spacer.

20. The spectrometer according to claim 18, wherein the at least one edge comprises a first edge for light input into the spectrometer module and a second edge for light output out of the spectrometer module to the photo detector.

* * * * *